United States Patent [19]

Inokuchi et al.

[11] Patent Number: 5,064,258
[45] Date of Patent: Nov. 12, 1991

[54] INFORMATION READING DEVICE

[75] Inventors: Toshiyuki Inokuchi, Yokohama; Nobuyuki Baba, Sagamihara, both of Japan

[73] Assignee: Ricoh Company, Ltd., Tokyo, Japan

[21] Appl. No.: 446,371

[22] Filed: Dec. 5, 1989

[30] Foreign Application Priority Data

| Dec. 9, 1988 | [JP] | Japan | 63-311587 |
| Dec. 9, 1988 | [JP] | Japan | 63-311588 |
| Jan. 9, 1989 | [JP] | Japan | 1-2322 |
| Feb. 21, 1989 | [JP] | Japan | 1-40902 |
| Feb. 21, 1989 | [JP] | Japan | 1-40903 |

[51] Int. Cl.$^5$ .............................................. G02B 26/10
[52] U.S. Cl. ................................... 350/3.71; 350/6.2; 369/103; 235/457; 250/201.5
[58] Field of Search ............... 350/3.7, 3.71, 6.2; 250/201.5; 369/103; 235/457

[56] References Cited

U.S. PATENT DOCUMENTS

| 4,415,224 | 11/1983 | Dickson | 350/3.71 |
| 4,540,247 | 9/1985 | Nishi et al. | 350/6.2 |
| 4,840,443 | 6/1989 | Debesis | 350/6.2 |

*Primary Examiner*—Bruce Y. Arnold
*Assistant Examiner*—Ryan
*Attorney, Agent, or Firm*—Oblon, Spivak, McClelland, Maier & Neustadt

[57] ABSTRACT

An information reading device which comprises a semiconductor laser source which emits a semiconductor laser beam and a first condenser lens for converging the laser beam to form an irradiation beam. A beam shaping optical system is disposed on the optical path of the laser beam to form a predetermined beam section shape of the irradiation beam which is converged by the first condenser lens. A hologram disk is used for deflecting the irradiation beam. The information reading device further comprises an optical path separation system. The optical path of the irradiation beam is separated from that of the reflection beam reflected from the scanning surface irradiated by the irradiation beam. A second condenser lens is arranged from converging the reflection beam separated from the irradiation beam by the optical path separation means. And an optical sensor is arranged for detecting the reflection beam converged by the second condenser lens.

7 Claims, 19 Drawing Sheets

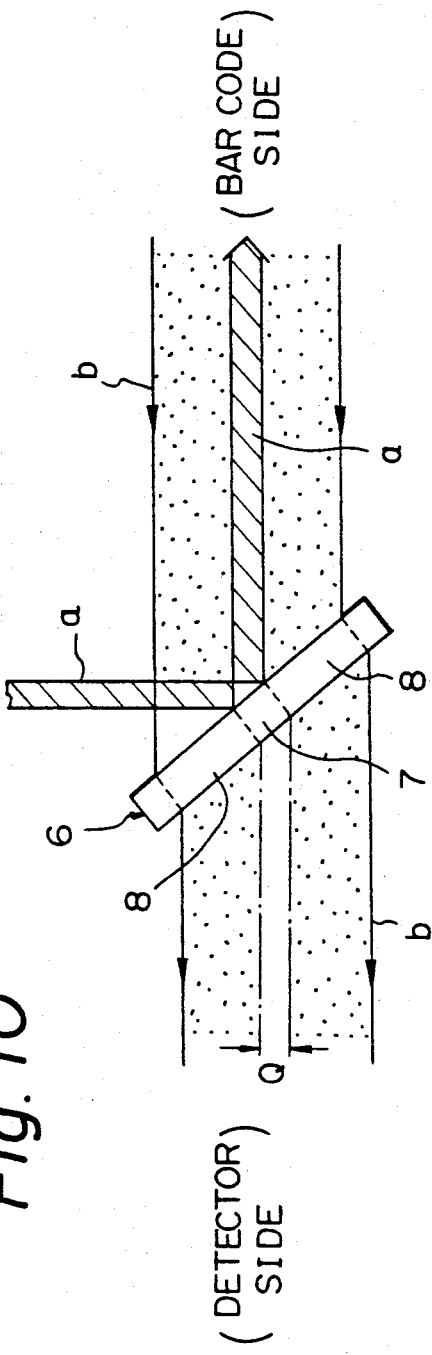
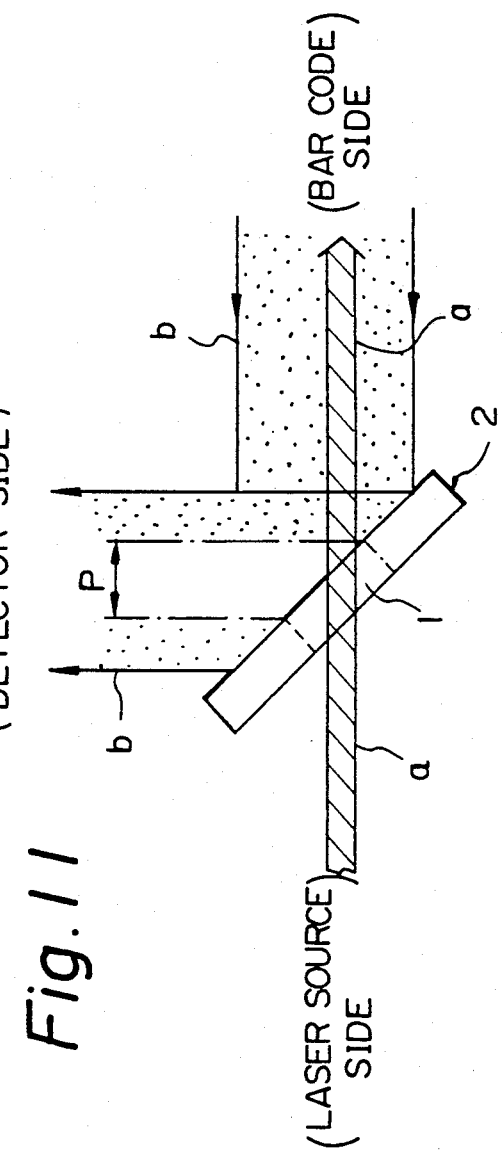
Fig. 10
Fig. 11

Fig. 35
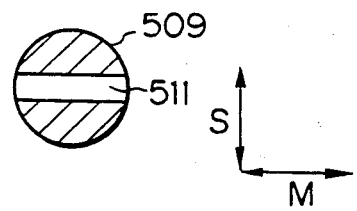
Fig. 36a  Fig. 36b  Fig. 36c  Fig. 36d
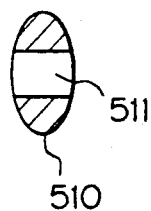 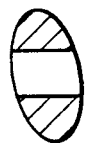 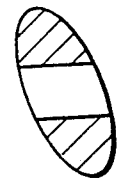 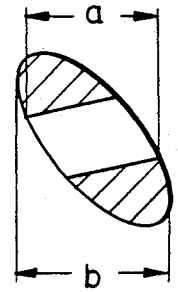
Fig. 37
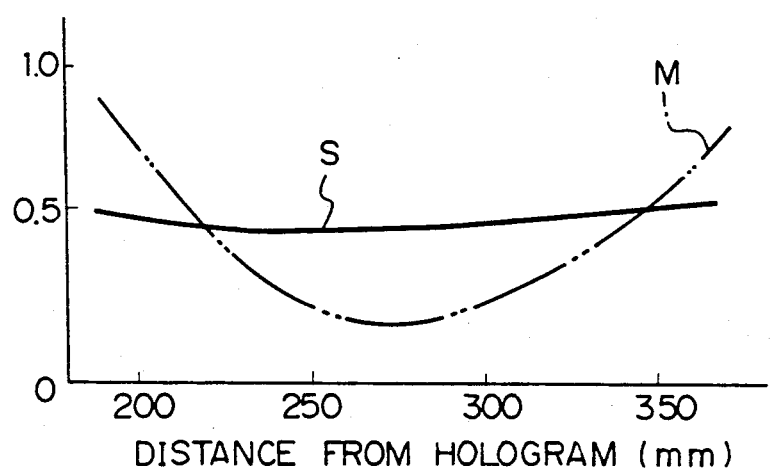

INFORMATION READING DEVICE

BACKGROUND OF THE INVENTION

The present invention relates to an information reading device such as a bar code reader. More particularly, the present invention relates to a laser bar code scanner using a hologram disk. The present invention also relates to a reconstructed hologram which is used as a hologram scanner or an ornamental hologram. The present invention further relates to a grating element used in a scanner such as a bar code reader and a laser printer and a method for producing the same.

Japanese Patent Application Laying Open (KOKAI) No. 53-117333 discloses an example of an information reading device used as a bar code reader or the like which reading device comprises a convergent type hologram disk. This prior art information reading device reads information of bar code in such a way that first a laser beam from a laser source passes through a convergent hologram disk, then the converged beam is irradiated to a scanning surface of a bar code to be read, and after that reflection rays reflected from the bar code are guided back to the convergent hologram to pass therethrough again so that the converged reflection rays are guided to and detedted by a photo-sensor.

There is also another known information reading device comprising a feed back optical system in which a scanning hologram which is the same as a convergent hologram is used, instead of comprising the above-mentioned reflection type optical system of the convergent hologram disk.

In the above-mentioned prior art information reading devices comprising the hologram disk, it is possible to compound various functions such as a converging function for converging the irradiating beam directed to the bar code to be scanned, a deflection function for deflecting the scanning beam by optical elements such as mirrors disposed on the optical path of the beam, an optical receiving function for receiving the reflection light reflected from the bar code, and a raster scanning function. This makes it possible to reduce the number of parts of the scanner and increase the scanning reliability thereof. However, the prior art information reading devices do not sufficiently satisfy the need for compact readers, especially need for thin readers.

Also, in accordance with the prior art information reading device, the optical path of the reflection beam is separated from that of the irradiating scanning beam by such a way that a mirror having an aperture at the center thereof is disposed on the optical path of the scanning beam inclining with respect to the scanning beam, so that the scanning irradiating beam passes through the aperture while the reflection rays are reflected by the mirror. The mirror reflects the rays reflected from the bar code toward an optical sensing means to detect the optical intensity of the reflection beam. However, since the aperture is arranged at the center of the mirror, a large part of the most intensive rays positioned at the center of the reflection beam is eclipsed from the mirror. As the result, the optical amount of the reflection beam to be detected is decreased, which impairs the optical detection efficiency of the reflection beam and lowers the reliability of the detection.

Also, as mentioned before, the information reading devices in accordance with the prior art are not very satisfactory in terms of realizing a thin scanner.

In order to meet the need for the thin and compact scanner, an information reading device is proposed which device comprises a semiconductor laser beam source for the source of scanning beam which source is constituted as one unit including the hologram disk and other optical systems so as to simplify the structure thereof. However, this proposed information reading device utilizes the semiconductor laser of invisible infrared having a wavelength more than 780 nm. Therefore, the position of the scanning beam spot can not be confirmed by the human eyes, which is inconvenient to adjust the scanning point of the laser beam at the time of operating the reading device.

To cope with this problem, it is proposed to prepare an LED laser of visible light and irradiate the visible laser beam to the bar code surface to be scanned using a galvano mirror, whereby enabling to adjust the scanning point of the laser beam by confirming the position thereof by the operator's eyes. However, this proposed reading device requires the specified laser beam source separated from the other optical systems, which increases the number of optical parts and makes the structure complicated as well as to rise the cost thereof.

In accordance with the prior art information reading device, the bar code is read by the following way with the use of the laser beam scanner comprising a hologram disk.

The laser beam is irradiated to the rotating hologram disk having a plurality of sectors so that the laser beam is deflected and swung by each sector whereby scanning the bar code surface to be read. The scanning beam is reflected by the bar code surface and deflected by the same hologram disk so that the hologram is reconstructed and detected by an optical sensor whereby the bar code is read.

The above-mentioned conventional hologram disk comprises a hologram having linear gratings. Therefore, when the angle of incidence does not meet the Bragg angle condition, a large astigmatism arises. Also, the beam spot shape is distorted on the position out of the scanning line center even if the Bragg angle condition is satisfied.

On the other hand, when the hologram disk is made from a hologram having circular arc gratings, if the wavelength of construction beam for making the hologram is different from that of reconstruction beam for reading the hologram, the astigmatism also arises and the beam spot shape is distorted on the portion out of the scanning line center.

Therefore, when such holograms are applied to the laser bar code scanner, the reading area which can be covered by the scanner is very narrow since the width of bar code is very small (about 0.2 mm).

In order to widen the reading area of the scanner, it is proposed to produce the hologram with the use of construction beams arranged by a complicated optical system so as to remove the astigmatism at the time of reconstruction of the hologram. However, the hologram made by this method requies a large rotation angle to reconstruct the hologram so that the scanning beam spot is distorted at a position where the scanning beam is largely swung.

Also, to avoid the astigmatism as possible, it is proposed, in Japanese Patent Application Laying Open (KOKAI) No. 60-238885, to produce a hologram with the use of a spherical wave having a wavelength of λ and a plane wave having the same wavelength of λ as construction waves which are arranged by passing through a prism having a predetermined apex angle and refractive index at a specified angle of incidence. However, the arrangement of such a prism and adjustment of the angle of incidence of the construction beam are not easy with regard to this method. Also, the astigmatism still remains in a portion of large scanning angle.

SUMMARY OF THE INVENTION

It is therefore an object of the present invention to provide an information reading device in which the above-mentioned problems are obviated so that the eclipse of the reflection beam is avoided to increase the optical efficiency of detecting the reflection beam to read the information.

It is another object of the present invention to provide an information reading device which is compact and thin.

It is still another object of the present invention to provide an information reading device comprising a hologram bar code scanner which has a wide scanning range to be covered and comprises a hologram which can be easily made by a simple process.

The object of the invention can be achieved by a first structure of an information reading device comprising: a first condenser lens for converging a laser beam emitted from a semiconductor laser source to form an irradiating beam; a beam shaping system for shaping the irradiating beam converged by the first condenser lens; a hologram disk for deflecting the irradiating beam; an optical path separation system for separating the irradiating beam and a reflection beam reflected by a surface irradiated by the irradiating beam; a second condenser lens for converging the reflection beam separated by the optical path separation system; and an optical sensing element for detecting the reflection beam converged by the second condenser lens.

Also, the above-mentioned object of the present invention can be achieved by a second structure of an information reading device comprising: a first condenser lens for converging a laser beam emitted from a semiconductor laser source to form an irradiating beam; a beam shaping system for shaping the irradiating beam converged by the first condenser lens; a hologram disk for deflecting the irradiating beam; an optical irradiation system for changing an optical path of the irradiating beam after entering into the hologram from that of the irradiating beam before entering thereinto; an optical path separation system for separating the irradiating beam and a reflection beam reflected by a surface irradiated by the irradiating beam; a second condenser lens for converging the reflection beam separated by the optical path separation system; and an optical sensing element for detecting the reflection beam converged by the second condenser lens.

In accordance with the first structure of the information reading device mentioned above, it becomes possible to decrease the eclipse of the reflection beam to be detected when compared with the prior art structure comprising the mirror having an aperture since the irradiating beam and the reflection beam are separated from each other by the optical path separation system which comprises a beam passing area and a beam reflection area.

Also, it becomes possible to elongate the reading depth of the scanning system even if the focal length of the optical system thereof is short since a semiconductor laser can be used as the scanning laser beam source instead of the conventional He-Ne laser and the scanning laser beam is formed in an adequate shape by the beam shaping system.

Also, in accordance with the second structure of the information reading device mentioned above, it becomes possible to realize a fully compact and thin scanning device by combining the semiconductor system together with the hologram disk and the optical irradiation system to form one optical unit.

Also, it becomes possible to decrease the eclipse of the reflection beam to be detected when compared with the prior art structure comprising the mirror having an aperture since the irradiating beam and the reflection beam are separated from each other by the optical path separation system which comprises a beam passing area and a beam reflection area.

Also, it becomes possible to elongate the reading depth of the scanning system even if the focal length of the optical system thereof is short since a semiconductor laser can be used as the scanning laser beam source instead of the conventional He-Ne laser and the scanning laser beam is formed in an adequate shape by the beam shaping system.

An advantage of the above-mentioned first structure of the information reading device of the present invention is that the reading reliability is increased by efficiently detecting the reflection beam due to that the eclipse of the reflection beam to be detected is decreased when compared with the prior art structure comprising the mirror having an aperture since the irradiating beam and the reflection beam are separated from each other by the optical path separation system which comprises a beam passing area and a beam reflection area.

Also, another advantage of the first structure of the information reading device of the present invention is that reading range to be covered is widened due to that the reading depth of the scanning system is elongeted even if the focal length of the optical system thereof is short since a semiconductor laser can be used as the scanning laser beam source instead of the conventional He-Ne laser and the scanning laser beam is formed in an adequate shape by the beam shaping system.

Also, still another advantage of the first structure of the information reading device of the present invention is that a fully compact and thin structure of the scanner can be realized by combining the semiconductor laser together with the hologram disk and the optical irradiation system to constitute one optical unit.

An advantage of the second structure of the information reading device of the present invention is that a fully compact and thin structure of the scanner can be realized by combining the semiconductor laser together with the hologram disk and the optical irradiation system to constitute one optical unit.

Also, another advantage of the above-mentioned second structure of the information reading device of the present invention is that the reading reliability is increased by efficiently detecting the reflection beam due to that the eclipse of the reflection beam to be detected is decreased when compared with the prior art structure comprising the mirror having an aperture since the irradiating beam and the reflection beam are separated from each other by the optical path separation system which comprises a beam passing area and a beam reflection area.

Also, still another advantage of the second structure of the information reading device of the present invention is that reading range to be covered is widened due to that the reading depth of the scanning system is elongeted even if the focal length of the optical system thereof is short since a semiconductor laser can be used as the scanning laser beam source instead of the conventional He-Ne laser and the scanning laser beam is formed in an adequate shape by the beam shaping system.

The object of the present invention mentioned before can be achieved by a third structure of an information reading device comprising: a first condenser lens for converging a laser beam emitted from a semiconductor laser source to form an irradiating beam; a beam shaping system for shaping the irradiating beam converged by the first condenser lens; a hologram disk for deflecting the irradiating beam; an optical path separation system for separating the irradiating beam and a reflection beam reflected by a surface irradiated by the irradiating beam; a second condenser lens for converging the reflection beam separated by the optical path separation system; an optical sensing element for detecting the reflection beam converged by the second condenser lens; and a visible light source for emitting a visible optical beam prepared other than the semiconductor laser source.

Also, the object of the present invention mentioned before can be achieved by a fourth structure of an information reading device comprising: a first condenser lens for converging a laser beam emitted from a semiconductor laser source to form an irradiating beam; a beam shaping system for shaping the irradiating beam converged by the first condenser lens; a hologram disk for deflecting the irradiating beam; an optical irradiation system for changing an optical path of the irradiating beam after entering into the hologram from that of the irradiating beam before entering thereinto; an optical path separation system for separating the irradiating beam and a reflection beam reflected by a surface irradiated by the irradiating beam; a second condenser lens for converging the reflection beam separated by the optical path separation system; an optical sensing element for detecting the reflection beam converged by the second condenser lens; and a visible light source for emitting a visible optical beam prepared in addition to the semiconductor laser source.

In accordance with the third structure of the information reading device mentioned above, the scanning point of the laser beam can be easily confirmed with the use of the visible beam emitted from the visible beam source which is simply disposed in addition to the optical scanning system including the semiconductor laser source for emitting the scanning irradiation beam and the hologram disk in such a way that the visible beam is guided to the information surface to be scanned along the same optical path as the irradiating scanning beam emitted from the semiconductor laser source using the same optical system as the irradiating scanning semiconductor laser beam. Also, it is unnecessary to prepare a special optical system for the visible beam source other than the optical system for the semiconductor laser beam source since the optical system can be commonly used.

In accordance with the fourth structure of the information reading device mentioned above, the scanning point of the laser beam on the information surface to be read can be easily adjusted due to the arrangement of the optical irradiation system disposed on the optical paths of the scanning beam emitted from the semiconductor laser source and the visible beam emitted from the visible light source so as to change the optical path thereof.

Advantages of the third structure of the information reading device of the present invention are that it becomes possible to easily confirm and adjust the scanning point of the laser beam with the use of the visible beam emitted from the visible beam source which is simply disposed in addition to the optical scanning system including the semiconductor laser source for emitting the scanning irradiation beam and the hologram disk in such a way that the visible beam is guided to the information surface to be scanned along the same optical path as the irradiating scanning beam emitted from the semiconductor laser source using the same optical system as the irradiating scanning semiconductor laser beam and that it is unnecessary to prepare a special optical system for the visible beam source other than the optical system for the semiconductor laser beam source since the optical system can be commonly used.

An advantage of the fourth structure of the information reading device mentioned above is that degree of design freedom of the optical scanning system is increased since the scanning point of the scanning beam on the information surface to be read can be easily changed and adjusted by changing the optical paths of the semiconductor laser beam for scanning the information and the visible beam for confirming the scanning position due to the function of the optical irradiation system disposed on the optical paths of the semiconductor laser beam and the visible beam.

Another advantage of the fourth structure of the information reading device mentioned above is that it becomed possible to enhance the luminous intensity of the visible beam as well as that of the scanning beam on the scanning surface and upgrade the converging characteristic of the optical system.

The object of the present invention mentioned before can be achieved by a hologram laser beam scanner comprising: a hologram disk having a hologram to which a laser beam emitted from a laser source is guided so as to deflect the laser beam to scan a bar code surface in a vertical direction and a horizontal direction; an optical sensor for detecting a reflection beam reflected from the bar code surface to read the bar code information; and a beam deformation system disposed on an optical path of the laser beam to deform the laser beam to an oval shape which is long in the horizontal direction and short in the vertical direction.

In accordance with the above-mentioned structure of the hologram laser beam scanner, the laser beam emitted from the laser beam source and incident upon the beam deformation system is deformed to an oval sectional shape which is long in the horizontal scanning direction and short in the vertical scanning direction. The horizontal longitudinal oval beam is guided to the hologram which deflects the laser beam so as to scan the bar code surface. In accordance with the converging characteristic of the hologram, the laser beam diameter is narrowed in the horizontal scanning direction so that the beam diameter in the horizontal scanning direction becomes the same as the width of the bar code line.

An advantage of the above-mentioned structure of the hologram laser beam scanner is that it becomes possible to widen the reading area of the bar code surface covered by the scanning beam since the laser beam emitted from the laser beam source and incident upon the beam deformation system is deformed to an oval sectional shape which is long in the horizontal scanning direction and short in the vertical scanning direction and the horizontal longitudinal oval beam is guided to the hologram which deflects the laser beam so as to scan the bar code surface which beam is, in accordance with the converging characteristic of the hologram, narrowed in its section in the horizontal scanning direction so that the beam diameter in the horizontal scanning direction becomes the same as the width of the bar code line.

Another advantage of the above-mentioned structure of the hologram laser beam scanner is that it becomes possible to heighten the sensitiveness of the scanner since the narrowed scanning beam efficiently detects the bar code without being badly affected by a defective portion of the bar code if any, whereby the reliability of the detection is increased.

Also, still another advantage of the above-mentioned structure of the hologram laser beam scanner is that it becomes possible to widen the scanning angle and avoid astigmatism of the reflection beam to be detected which was one of the problems of the prior art, simply by deforming the laser beam to holizontally longitudinal oval shape in section with the use of a beam compressor before entering into the hologram disk, which makes it possible to produce the hologram disk by a simple exposure device using a divergent spherical wave and a plane wave, whereby simplifying the process for producing the hologram.

Further objects and advantages of the present invention will be apparent from the following description of the preferred embodiments of the invention as illustrated in the accompanying drawings.

BRIEF DESCRIPTION OF THE DRAWINGS

FIG. 6b is a plan view of the information reading device of FIG. 6a;

FIG. 6c is a front view of the information reading device of FIG. 6a;

FIG. 10 is an explanatory view of an optical path separation means in accordance with the present invention;

FIG. 11 is an explanatory view of an optical path separation means in accordance with the prior art;

FIG. 18b is a plan view of the information reading device of FIG. 18a;

FIG. 18c is a front view of the information reading device of FIG. 18a;

FIG. 35 is an explanatory view of a state wherein a circular beam is converted to a deformed beam by an aperture which divide the circular beam to an upper half portion and a lower half portion in accordance with the present invention;

FIG. 36a to 36d are explanatory views for explaining a state wherein the deformed beam of FIG. 35 is deformed along with the rotation of the hologram disk, each representing a different state of the beam in sequence, respectively; and FIG. 37 is a graphical view for representing a converging characteristic of the hologram disk to which a deformed laser beam is irradiated.

DESCRIPTION OF THE PREFERRED EMBODIMENTS

Embodiments of the present invention are described hereinafter in detail in comparison to the prior art with reference to the drawings.

Figure 1:
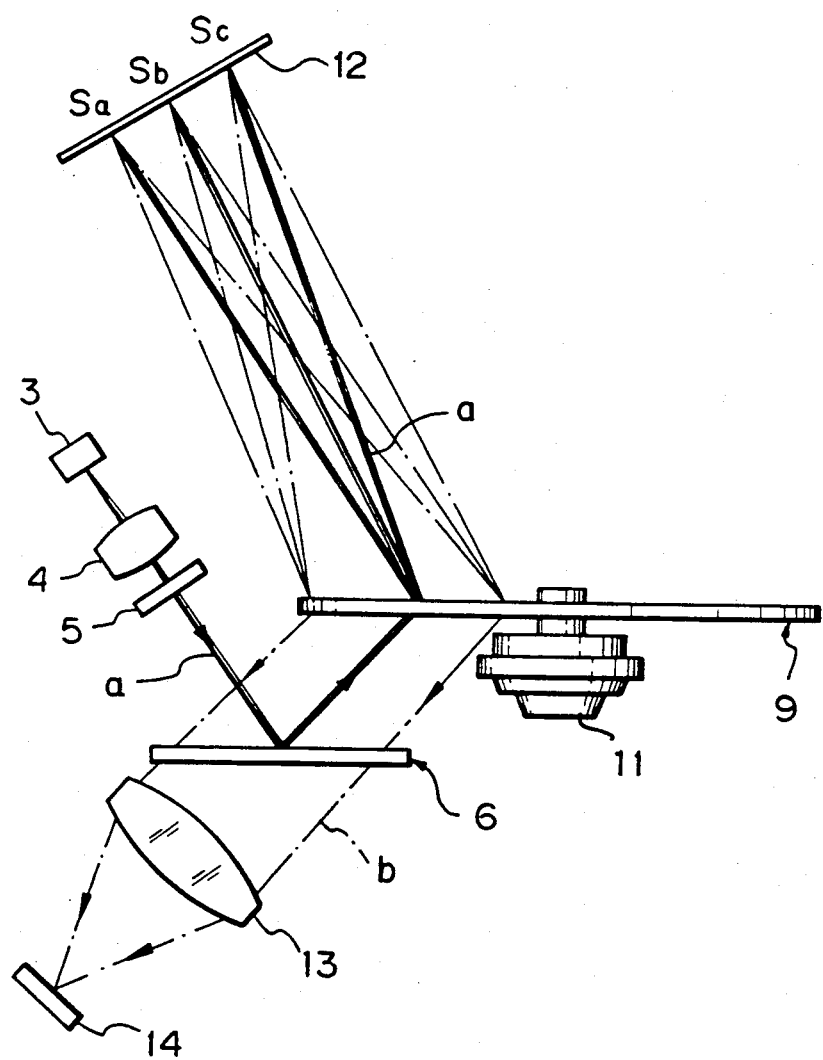
FIG. 1 is a constructional view of an embodiment of the present invention.
Figure 2:
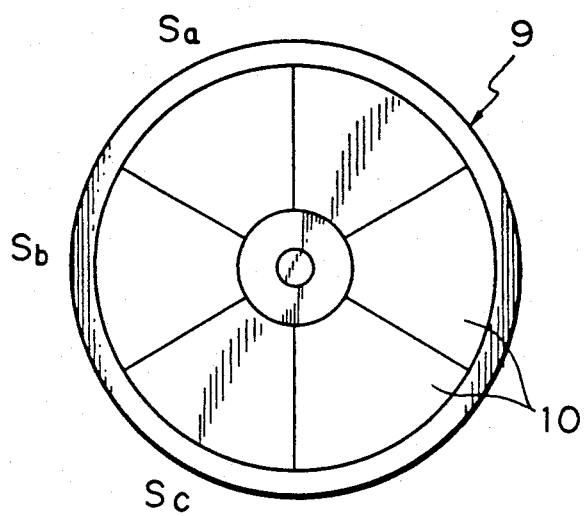
FIG. 2 is a plan view if a hologram disk used in the scanning device of the present invention.
Figure 3:
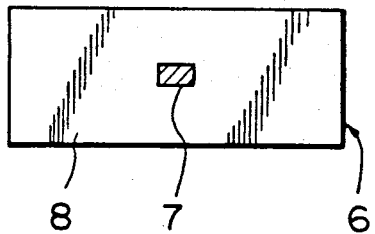
FIG. 3 is a front view of a partly reflection mirror.

A first embodiment of the present invention is described first with reference to FIGS. 1 to 4. FIG. 1 illustrates an essential structure of an embodiment of the information reading device in accordance with the present invention. A laser beam emitted from a semiconductor laser element 3 is converged by a first condenser lens 4 so that an irradiation beam (a) is formed. The irradiation beam (a) is shaped and trimmed by a mask 5 so that the irradiation beam (a) is shaped to have a predetermined sectional shape. After that, the irradiation beam (a) is reflected by a partial reflection mirror 6 which functions as an optical path separation means. The partial reflection mirror 6 has a reflection portion 7 at the center thereof, as illustrated in FIG. 3. The reflection portion 7 has substantially the same area as the sectional area of the irradiation beam (a). A passing through portion 8 is formed surrounding the reflection portion 7. In accordance with this structure of the partial reflection mirror 6, the irradiation beam (a) is reflected by the reflection portion 7 thereof so that the direction of the optical path thereof is changed. The reflected irradiation beam (a) is guided toward a hologram disk 9.

FIG. 2 illustrates the hologram disk 9 seen from the upper side thereof.

As illustrated in FIG. 2, the hologram disk 9 comprises six sectors 10. A motor 11 (FIG. 1) is arranged under the hologram disk 9 to rotate it at a high speed. Each sector (for example Sa, Sb, Sc) of the hologram disk 9 has a different deflection angle so that the irradiation beam (a) is deflected toward a different direction after passing through each sector, i.e., a different optical path is formed by each of the hologram sectors. In this particular embodiment, the optical path of the irradiation beam (a) is separated to three different optical paths by the sectors Sa, Sb and Sc, respectively. The separated irradiation beams (a) irradiate a bar code surface 12 to be read. In this case, the scanning direction of each beam (a) is perpendicular to the paper plane of FIG. 1. Scanning in this way is called "self raster scan". By scanning the bar code surface 12 by the self raster scan way, it becomes possible to heighten the reliability of reading the information written on the bar code surface 12.

A part of the reflection rays emitted from the bar code surface 12 propagates back toward the hologram disk 9 and passes therethrough again. The reflection beam is deflected backward by the hologram disk 9 in the same manner as in the forward propagation of the irradiation beam (a). The reflection beam (b) deflected by the hologram disk 9 is then passes through the passing through portion 8 (FIG. 3) of the partial reflection mirror 6 and after that converged by a second condenser lens 13 toward an optical detector element 14. The optical detector element 14 detects the optical amount of the reflection beam emitted from the bar code surface so that the information written thereon can be read.

Figure 4:
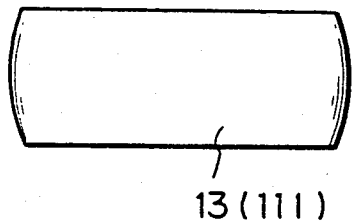
FIG. 4 is a front view of a second condenser lens.

It is to be noted that, as illustrated in FIG. 4, the second condenser lens 13 has a shape which is laterally longitudinal with respect to the reflection beam (b) seen from the incident side thereof to the lens.

FIG. 10 explanatorily illustrates the function of the partial reflection mirror 6 installed within the above mentioned essential structure of the information reading device of the present invention.

As illustrated in FIG. 10, the irradiation beam (a) is reflected by the reflection portion 7 of the partial reflection mirror 6. The reflection portion 7 has approximately the same area as the irradiation beam section. On the other hand, the reflection beam (b) passes backward through this partial reflection mirror 6 through the passing through portion 8 thereof. The passing through portion 8 surrounds entirely the central reflection portion 7. The eclipse area of the reflection beam (b) is represented by Q.

In comparison to the structure of FIG. 10, the optical path separation means of the prior art is explanatorily illustrated in FIG. 11. The prior art structure comprises a mirror 2 which has an aperture 1 at the center thereof and arranged being inclined with respect to the optical path of the irradiation beam (a). The irradiation beam (a) passes through the aperture 1 while the reflection beam (b) is reflected by the mirror 2. In this prior art structure, the eclipse area of the reflection beam (b) is represented by P.

As can be seen from FIGS. 10 and 11, the eclipse area Q of the reflection beam (b) in accordance with the present invention is far less than the eclipse area P of the prior art structure. Therefore, in accordance with the present invention, the optical amount of the reflection beam (b) which is guided to and received by the detector element 14 is large in comparison to that of the prior art so that the reflection beam is efficiently detected by the detector, which heightens the reliability of the detection result of the detector element.

Also, in accordance with the present invention, the semiconductor laser element 3 is used instead of the He-Ne laser source which is conventionally used as the laser beam source and the semiconductor laser beam of the present invention passes through the mask 5 which shapes the beam to have a predetermined sectional profile of spot. Therefore, it becomes possible to enlarge the reading depth of the detector even if the focal length of the irradiation beam system is short as is the case of the structure of the above-mentioned embodiment of the present invention.

Figure 5:
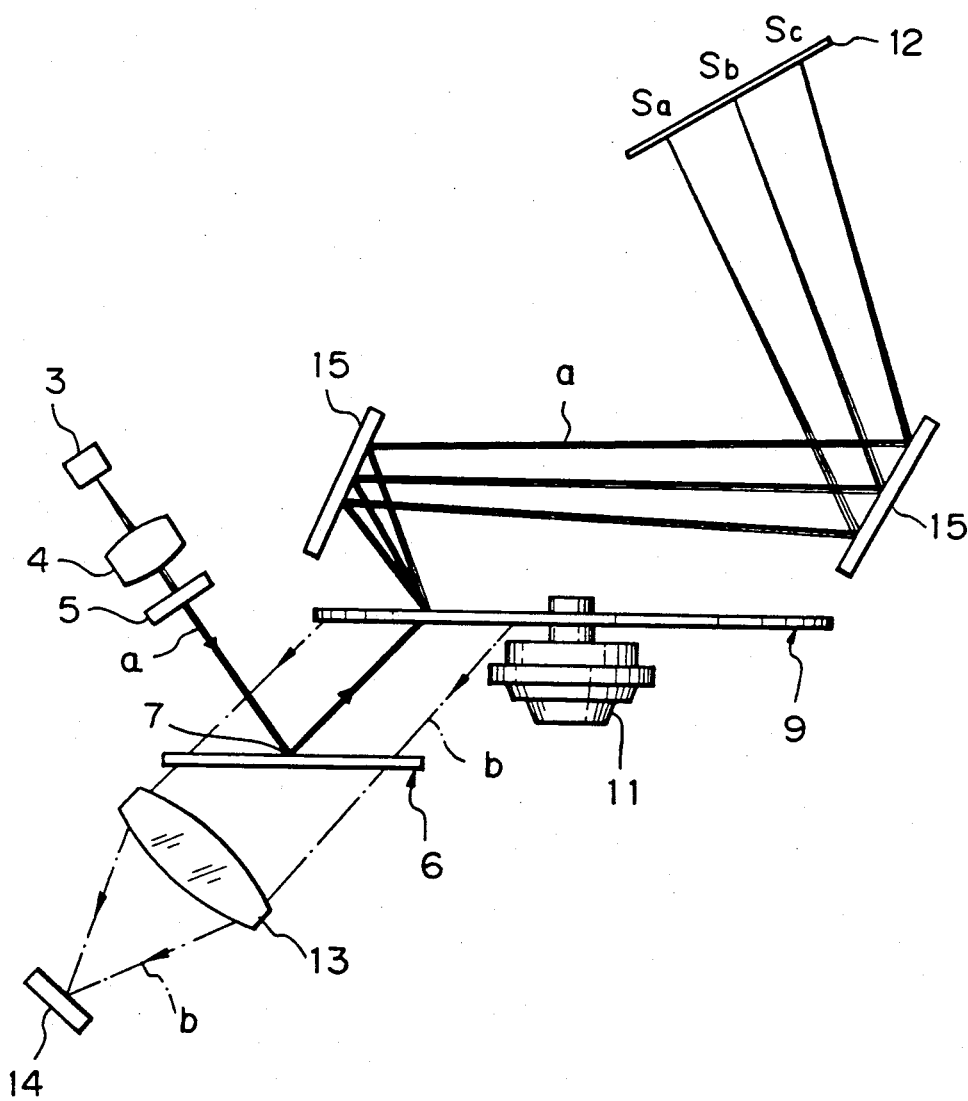
FIG. 5 is a constructional view of another embodiment of the present invention.

Another embodiment of the present invention is described hereinafter with reference to FIG. 5 which illustrates an essential structure of this second embodiment as FIG. 1 of the first embodiment.

In this embodiment, the optical irradiation system comprises a pair of mirrors 15 which reflect the irradiation beam (a) deflected by the hologram disk 9 to guide the beam to the bar code 12. By adopting the arrangement wherein the irradiation beam is guided to the bar code by the mirrors, it becomes possible to increase the degree of freedom when designing the optical scanning system.

Figure 6A:
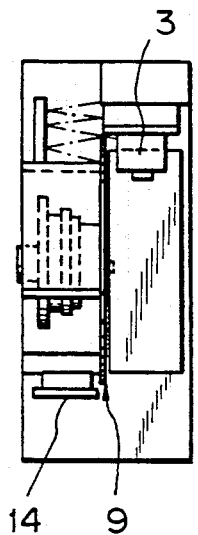
FIG. 6a is a side view of an information reading device formed in one body as one unit.
Figure 6B:
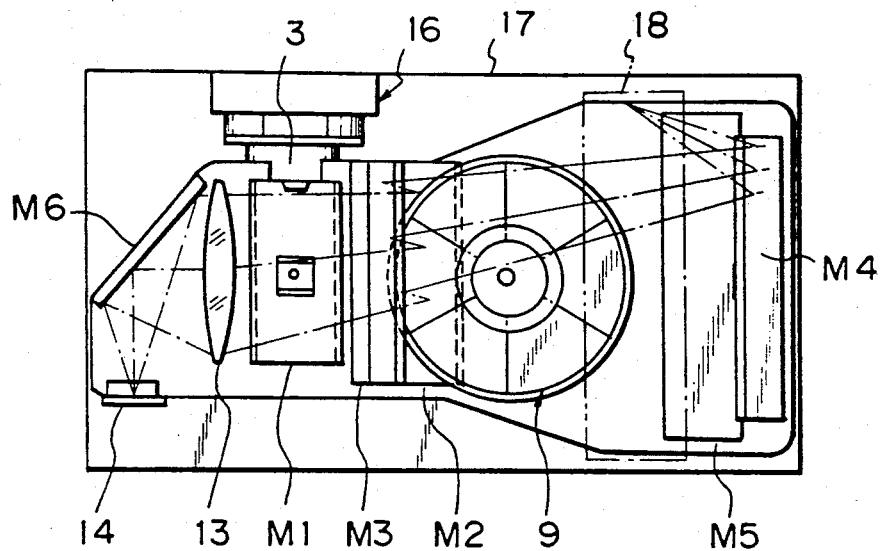
Figure 6C:
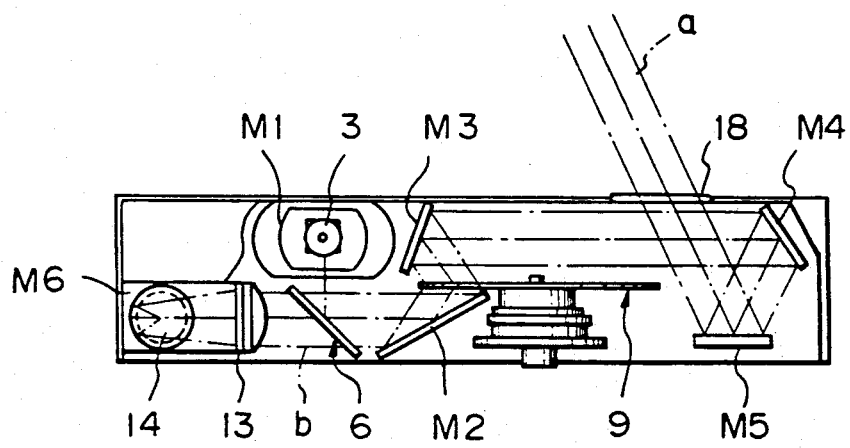

FIGS. 6a to 6c represent a scanning unit structure which comprises either of the above-mentioned two essential embodiments of the present invention.

In FIG. 6b, an LD (laser diode) unit 16 which comprises a semiconductor laser element 3 is disposed at an upper portion of the scanning unit in the drawing. A not shown heat radiator plate of the LD unit 16 is disposed on the outside of a housing 17 of the scanning unit.

As illustrated in FIG. 6c, the irradiation beam (a) which is emitted from the semiconductor element 3 and converged and shaped by the first condenser lens and the mask (not shown in this drawing) propagates in the housing of the scanning unit by being reflected by a mirror M1, the reflection portion at the center of the partial reflection mirror 6, another mirror M2, then passing through and deflected by the hologram disk 9 and after that reflected by mirrors M3, M4 and M5 in this order. After reflected by the final mirror M5, the irradiation beam (a) is emitted outward from the scanning unit through a window 18 thereof and irradiates the bar code surface.

The reflection beam from the bar code surface enters back into the scanning unit through the window 18 and propagates back in the housing thereof via the mirrors M5, M4, M3, the hologram disk 9, the mirror M2, the passing through portion of the partial reflection mirror 6, the second condenser lens 13 and a mirror M6 in this sequence. After reflected by the mirror M6, the reflection beam is detected by the optical detector element 14.

As mentioned above, the optical scanning unit illustrated in FIGS. 6a to 6c is constituted by assembling the LD unit 16 comprising the semiconductor laser element 3, the hologram disk 9 and mirrors M1 to M6 in a form of one body as one unit. Therefore, it becomes possible to realize a fully compact and thin scanning device.

Variants of the scanning unit of FIGS. 6a to 6c are described below with reference to FIGS. 7 to 9. Each variant is characterized and distinguishable in the point of the optical path of the irradiation scanning beam (a) deflected by the hologram disk 9 and guided to the bar code surface to be read.

Figure 7:
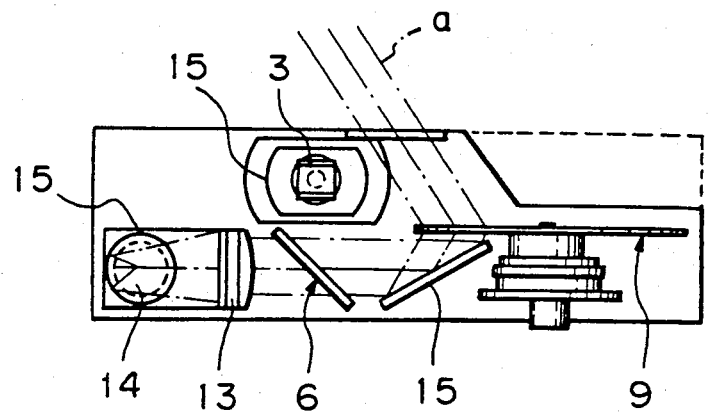
FIG. 7 is an explanatory view of an example of an optical path of the deflected beam of the information reading device of the present invention.

FIG. 7 illustrates a scanning unit structure in which the irradiation beam (a) deflected by the hologram disk 9 is obliquely emitted out of the unit housing. In accordance with this structure, no mirror is disposed above the hologram disk 9, which makes it possible to simplify the structure thereof and realize a further compact scanning device.

Figure 8:
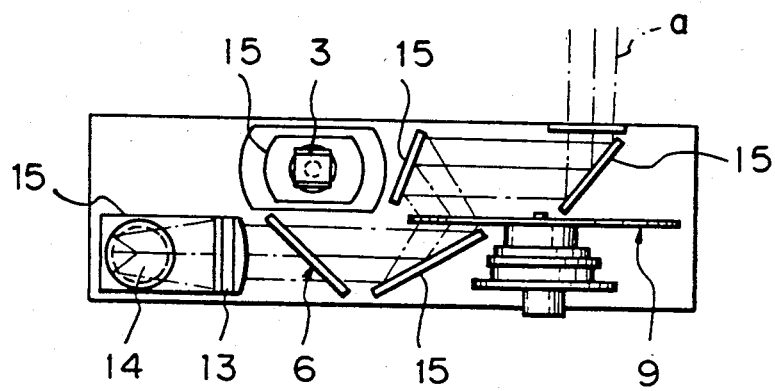
FIG. 8 is an explanatory view of another example of the optical path of the deflected beam of the information reading device of the present invention.

FIG. 8 illustrates another scanning unit structure in which the irradiation beam (a) deflected by the hologram disk 9 is vertically emitted out of the unit housing.

Figure 9:
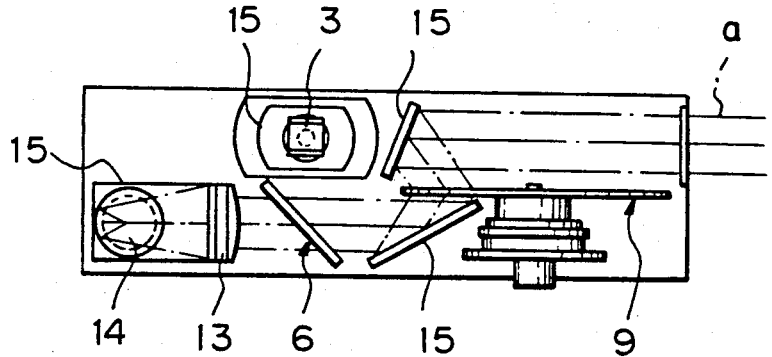
FIG. 9 is an explanatory view of still another example of the optical path of the deflected beam of the information reading device of the present invention.

FIG. 9 illustrates still another scanning unit structure in which the irradiation beam (a) deflected by the hologram disk 9 is horizontally emitted out of the unit housing.

By changing the optical path direction of the irradiation beam with respect to the scanning unit housing, it becomes possible to further increase the degree of design freedom when assembling the scanning unit which constitutes the information reading device.

The optical path separation means of the above-mentioned embodiments is constituted by the partial reflection mirror 6 which has a reflection portion 7 at the center thereof and a passing through portion 8 surrounding the central reflection portion 7. However, the optical path separation means structure is not limited to the above-mentioned structure. It may comprise instead a partial reflection mirror which has a passing through portion at the center thereof and a reflection portion surrounding the central passing through portion.

Another embodiment of the present invention is described hereinafter with reference to FIG. 12.

Figure 12:
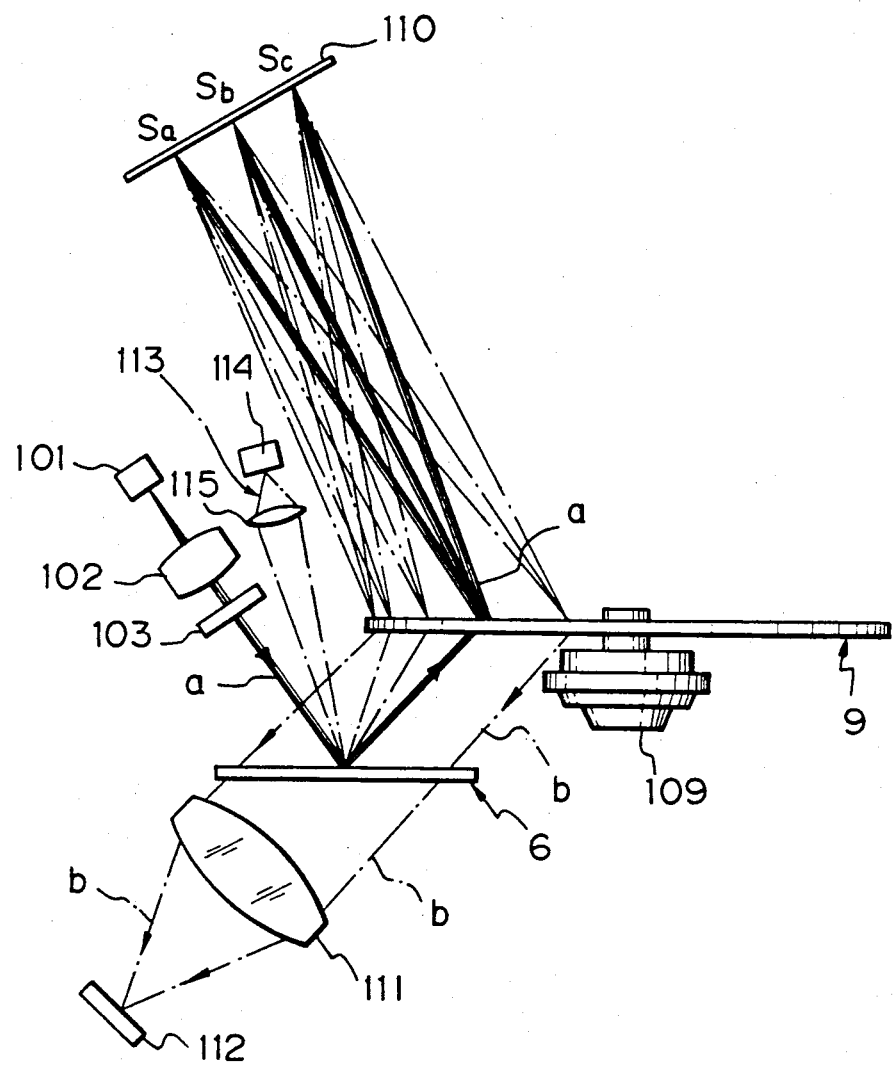
FIG. 12 is a constructional view of still another embodiment of the present invention.

First, a whole structure of the embodiment of FIG. 12 is schematically described below referring to the function thereof as well.

A laser beam emitted from a semiconductor laser element 101 is converged by a first condenser lens 102 so that an irradiation beam (a) is formed. The irradiation beam (a) is shaped and trimmed by a mask 103 so that the irradiation beam (a) is shaped to have a predetermined sectional shape. After that, the irradiation beam (a) is reflected by a partial reflection mirror 6 which functions as an optical path separation means. The partial reflection mirror 6 has a reflection portion 7 at the center thereof, as illustrated in FIG. 3. The reflection portion 7 has substantially the same area as the sectional area of the irradiation beam (a). A passing through portion 8 is formed surrounding the reflection portion 7. In accordance with this structure of the partial reflection mirror 6, the irradiation beam (a) is reflected by the reflection portion 7 thereof so that the direction of the optical path thereof is changed. The reflected irradiation beam (a) is guided toward a hologram disk 9.

FIG. 2 illustrates the hologram disk 9 seen from the upper side thereof.

As illustrated in FIG. 2, the hologram disk 9 comprises six sectors 10. A motor 109 (FIG. 12) is arranged under the hologram disk 9 to rotate it at a high speed. Each sector (for example Sa, Sb, Sc) of the hologram disk 9 has a different deflection angle so that the irradiation beam (a) is deflected toward a different direction after passing through each sector, i.e., a different optical path is formed by each of the hologram sectors. In this particular embodiment, the optical path of the irradiation beam (a) is separated to three different optical paths by the sectors Sa, Sb and Sc, respectively. The separated irradiation beams (a) irradiate a bar code surface 110 to be read. In this case, the scanning direction of each beam (a) is perpendicular to the paper plane of FIG. 12. Scanning in this way is called "self raster scan". By scanning the bar code surface 110 by the self raster scan way, it becomes possible to heighten the reliability of reading the information written on the bar code surface 110.

A part of the reflection rays emitted from the bar code surface 110 propagates back toward the hologram disk 9 and passes therethrough again. The reflection beam is deflected backward by the hologram disk 9 in the same manner as in the forward propagation of the irradiation beam (a). The reflection beam (b) deflected by the hologram disk 9 is then passes through the passing through portion 8 (FIG. 3) of the partial reflection mirror 6 and after that converged by a second condenser lens 111 toward an optical detector element 112. The optical detector element 112 detects the optical amount of the reflection beam emitted from the bar code surface so that the information written thereon can be read.

It is to be noted that, as illustrated in FIG. 4, the second condenser lens 111 has a shape which is laterally longitudinal with respect to the reflection beam (b) seen from the incident side thereof to the lens.

In accordance with the embodiment of FIG. 12, a visible light source 113 is disposed in the same side as the semiconductor laser element 101 with respect to the partial reflection mirror 6. The visible light source 113 comprises an LED 114 which emits a visible light near infrared region and a condenser lens 115 which converges the visible light emitted from the LED 114.

An essential function of the above-mentioned information reading device provided with the visible light source 113 is described hereinafter with reference to FIGS. 13 and 14.

Figure 13:
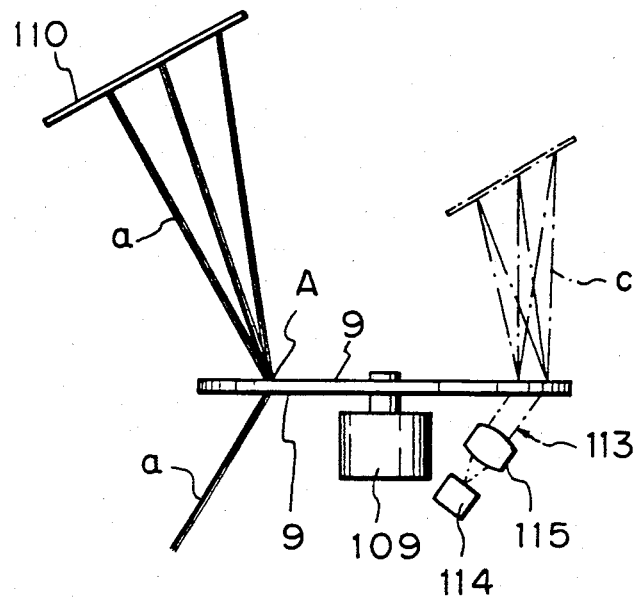
FIG. 13 is an explanatory view of the optical paths of the irradiating scanning beam and the reflection beam thereof passing through the hologram disk of FIG. 12.

FIG. 13 explanatorily illustrates the optical path of the visible beam of rays (c) emitted from the LED 114 of the visible light source 113 and that of the irradiation beam of rays (a) emitted from the semiconductor laser element 101, respectively. Each of the beams (a) and (c) incident upon the hologram disk 9 is divided to three beams of rays by the function of the sectors 10 of the hologram disk 9 comprising three different kind of sectors Sa, Sb and Sc, each having a different deflective characteristic.

Each of the two incident beams (a) and (c) impinges upon a different hologram sector. For example, when the irradiation beam (a) for scanning the bar code impinges upon a sector of the hologram disk 9 at a position (A), the other beam (c) for confirmation of the scanning point is arranged to impinge upon one of the remaining sectors at a position other than the position (A).

Figure 14:
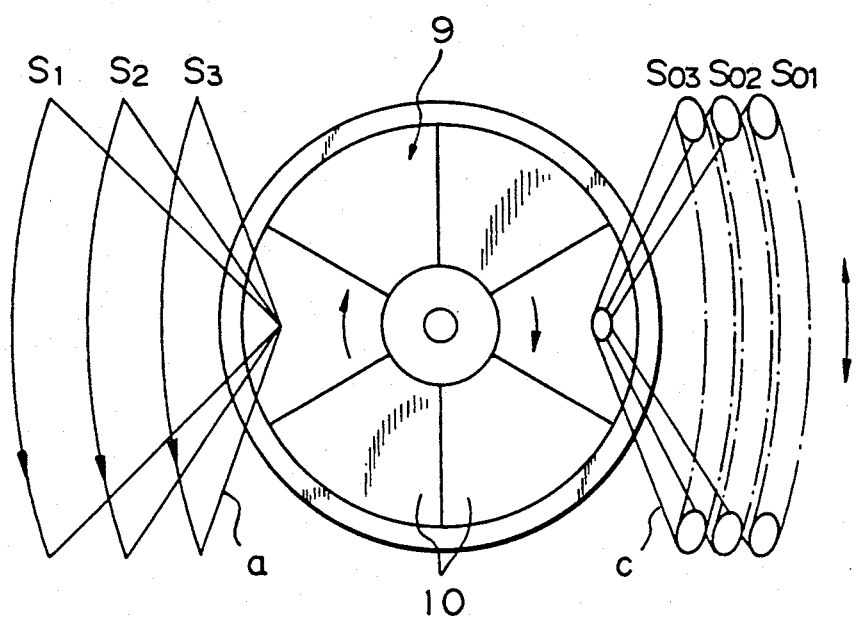
FIG. 14 is an explanatory view of the optical paths of FIG. 13 seen from the upper side thereof.

FIG. 14 explanatorily illustrates the optical paths of the above-mentioned two beams (a) and (c) after passing through the hologram disk 9 in the state of scanning operation and seen from the bar code side.

In the state of FIG. 14, the spot diameter of the scanning irradiation beam (a) is very smalll, for example less than 0.2 mm, so that three thin lines of scanning patterns $S_1$, $S_2$ and $S_3$, respectively can be obtained with the use of the self raster scan type hologram disk 9.

On the other hand, the spot diameter of the visible beam (c) is relatively large since it must be visible to confirm the scanning position on the bar code surface. Therefore, three relatively thick lines of scanning patterns $S_{01}$, $S_{02}$ and $S_{03}$ are arranged as illustrated in FIG. 14.

In accordance with the arrangement of the irradiation beam (a) and the visible beam (c) as mentioned above, it becomes possible to easily and reliably confirm the position of the scanning spot since the scanning position of the irradiation beam (a) is different from that of the visible beam (c).

Another embodiment of the present invention is described hereinafter with reference to FIGS. 15 to 17.

This embodiment comprises a pair of mirrors 116 as the optical irradiation system on the optical path of the irradiation beam (a). That is, as illustrated in FIG. 15, the two mirrors 116 are arranged to change the direction of the optical path of the irradiation beam (a) after being deflected by the hologram disk 9 so that the irradiation beam (a) is combined with the visible beam (c) emitted from the LED 114 of the visible light source 113.

Figure 16:
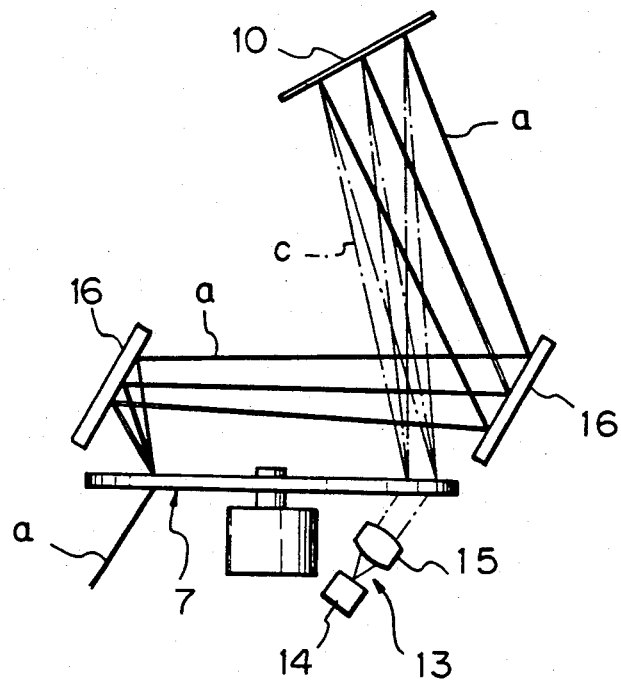
FIG. 16 is an explanatory view of the optical paths of the irradiating scanning beam and the reflection beam thereof passing through the hologram disk of FIG. 15.
Figure 17:
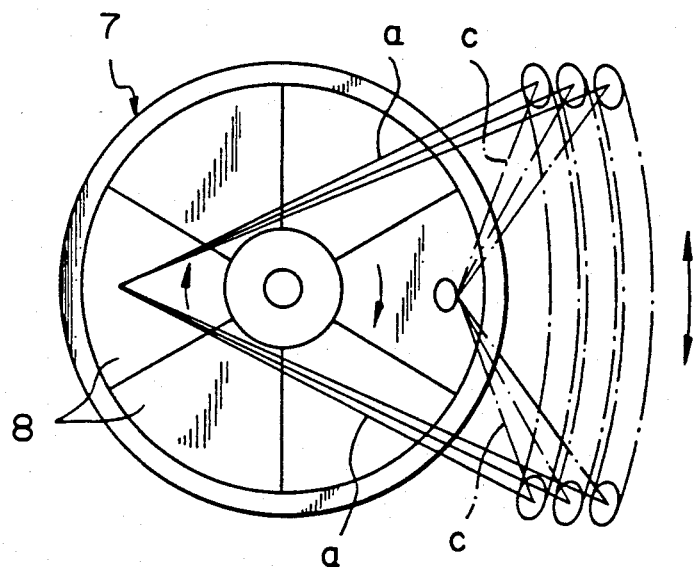
FIG. 17 is an explanatory view of the optical paths of FIG. 16 seen from the bar code side.

FIG. 16 illustrates an essential structure of the main portion of this embodiment comprising the above-mentioned mirrors 116. With this structure, the irradiation beam (a) and the visible beam (c) scan the bar code surface 110 together with each other, as illustrated in FIG. 17.

By the arrangement of the mirrors 116, the direction of the irradiation beam can be desirably changed, which makes it possible to increase the degree of design freedom of the optical scanning system.

Figure 15:
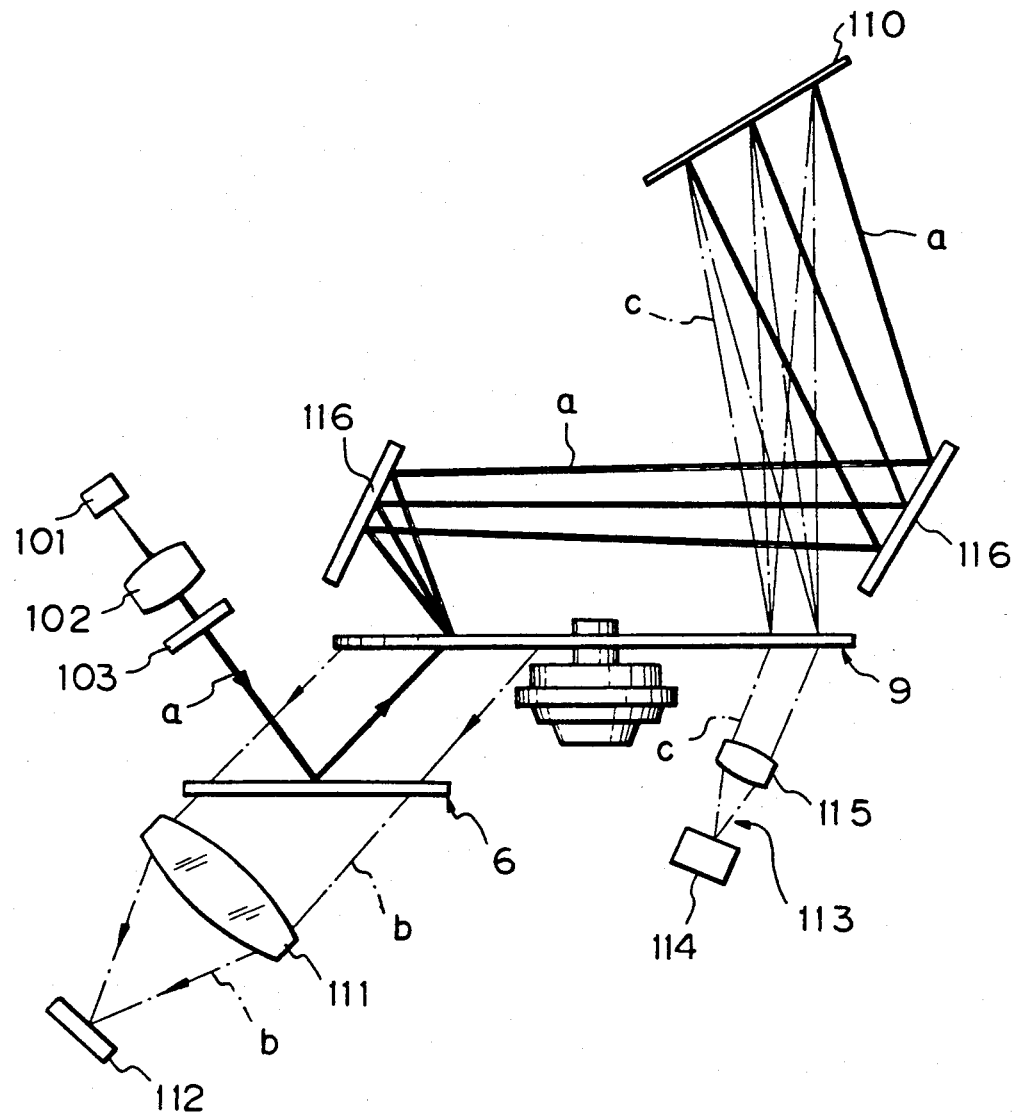
FIG. 15 is a constructional view of still another embodiment of the present invention.

The embodiments of FIGS. 12 and 15 comprise the following structure in common.

First, both embodiments comprise the partial reflection mirror 6 as an optical separation means. The difference between the partial reflection mirror 6 of the present invention and the prior art mirror 2 having an aperture is described with reference to FIGS. 10 and 11 hereinafter.

FIG. 10 explanatorily illustrates the function of the partial reflection mirror 6 installed within the above mentioned essential structure of the information reading device of the present invention.

As illustrated in FIG. 10, the irradiation beam (a) is reflected by the reflection portion 7 of the partial reflection mirror 6. The reflection portion 7 has approximately the same area as the irradiation beam section. On the other hand, the reflection beam (b) passes backward through this partial reflection mirror 6 through the passing through portion 8 thereof. The passing through portion 8 surrounds entirely the central reflection portion 7. The eclipse area of the reflection beam (b) is represented by Q.

In comparison to the structure of FIG. 10, the optical path separation means of the prior art is explanatorily illustrated in FIG. 11. The prior art structure comprises a mirror 2 which has an aperture 1 at the center thereof and arranged being inclined with respect to the optical path of the irradiation beam (a). The irradiation beam (a) passes through the aperture 1 while the reflection beam (b) is reflected by the mirror 2. In this prior art structure, the eclipse area of the reflection beam (b) is represented by P.

As can be seen from FIGS. 10 and 11, the eclipse area Q of the reflection beam (b) in accordance with the present invention is far less than the eclipse area P of the prior art structure. Therefore, in accordance with the present invention, the optical amount of the reflection beam (b) which is guided to and received by the detector element 112 is large in comparison to that of the prior art so that the reflection beam is efficiently detected by the detector, which heightens the reliability of the detection result of the detector element.

Also, in accordance with the present invention, the semiconductor laser element 101 is used instead of the He-Ne laser source which is conventionally used as the laser beam source and the semiconductor laser beam of the present invention passes through the mask 103 which shapes the beam to have a predetermined sectional profile of spot. Therefore, it becomes possible to enlarge the reading depth of the detector even if the focal length of the irradiation beam system is short as is the case of the structure of the above-mentioned embodiment of the present invention.

Figure 18A:
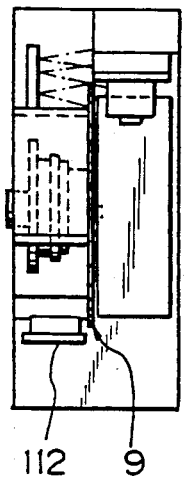
FIG. 18a is a side view of an example of the information reading device formed in one body as one unit.
Figure 18B:
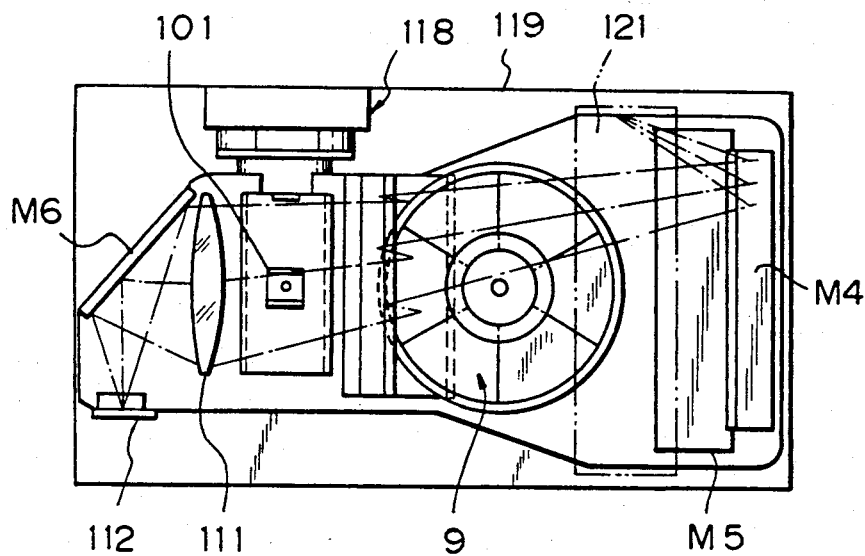
Figure 18C:
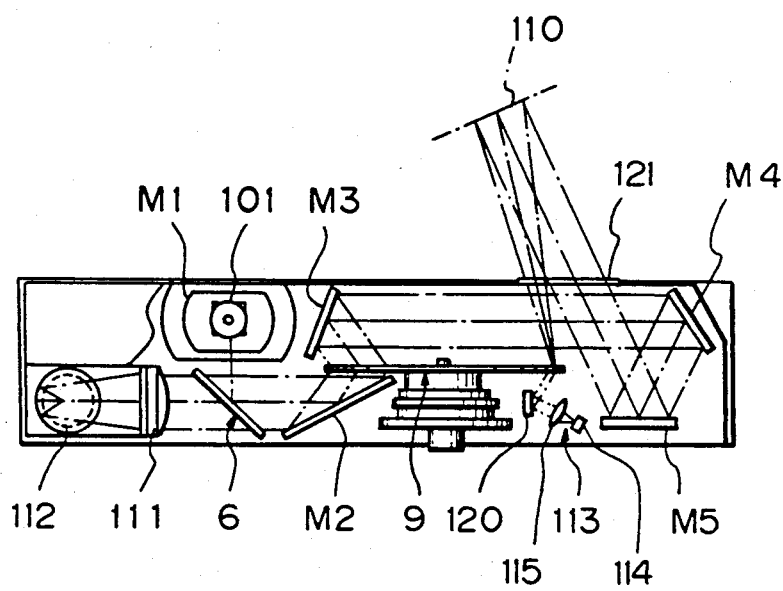

FIGS. 18a to 18c represent a scanning unit structure which comprises either of the above-mentioned two essential embodiments of FIGS. 12 and 15 in accordance with the present invention.

In FIG. 18b, an LD (laser diode) unit 118 which comprises a semiconductor laser element 101 is disposed at an upper portion of the scanning unit in the drawing. A not shown heat radiator plate of the LD unit 118 is disposed on the outside of a housing 119 of the scanning unit.

As illustrated in FIG. 18c, the visible beam (c) which is emitted from the LED 114 of the visible light source 113 passes through the condenser lens 115 and the beam is reflected by the mirror 120. The visible beam (c) passes through the hologram 9 that deflects the beam (c) toward the bar code surface 110.

On the other hand, the irradiation beam (a) which is emitted from the semiconductor laser element 101 of the LD unit 118 passes through the first condenser lens and the mask (not shown in this drawing) and further propagates in the housing of the scanning unit by being reflected by a mirror M1, the reflection portion at the center of the partial reflection mirror 6, another mirror M2, then passing through and deflected by the hologram disk 9 and after that reflected by mirrors M3, M4 and M5 in this order. After reflected by the final mirror M5, the irradiation beam (a) is emitted outward from the scanning unit through a window 121 thereof and irradiates the bar code surface 110.

As mentioned above, the irradiation beam (a) and the visible beam (c) are combined together and irradiate the bar code surface 110 together with each other so that the scanning position can be easily confirmed.

Still another embodiment of the present invention is described hereinafter in comparison to the prior art.

A conventional emboss hologram method is used to produce an ornamental reconstructive hologram for example. Nowadays, it has become possible to produce a high density hologram having a high spatial frequency by using an ultraviolet-setting resin.

A general method for producing the reconstructive hologram using the ultraviolet-setting resin is described hereinafter with reference to FIGS. 23a to 23g.

Figure 23A:
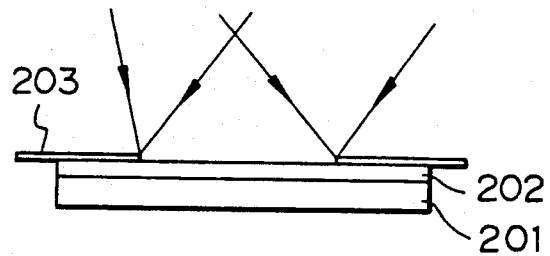
FIGS. 23a to 23g are explanatory views for explaining an example of reconstructing sequence of the hologram representing a different step thereof in sequence, respectively.
Figure 23B:
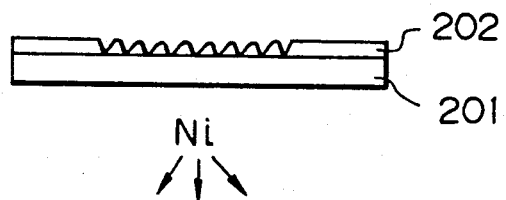
Figure 23C:
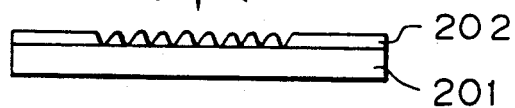

First, as illustrated in FIGS. 23a to 23c, a photoresist 202 is coated on a surface of a glass substrate (prototype plate) 201. The photoresist 202 is covered by a mask 203 and exposed through the mask 203 (FIG. 23a). The exposed photoresist 202 is then developed (FIG. 23b). After that, nickel (Ni) is sputtered on the photoresist 202 (FIG. 23c).

Figure 23D:
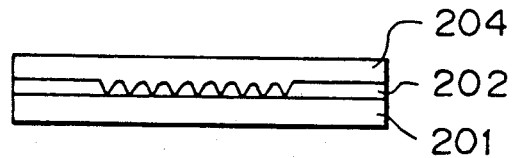

After that, the substrate 201 is treated by an electroforming process to form a nickel layer 204 on the nickel sputtered surface of the substrate (FIG. 23d).

Figure 23E:
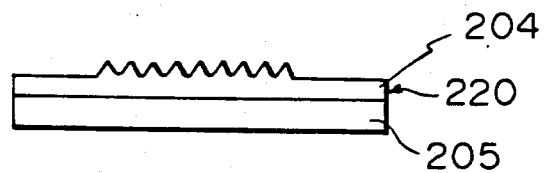

The nickel layer 204 is removed from the substrate 201 and back-coated with an aluminum plate 205 to form a stamper 220, as illustrated in FIG. 23e.

Figure 23F:
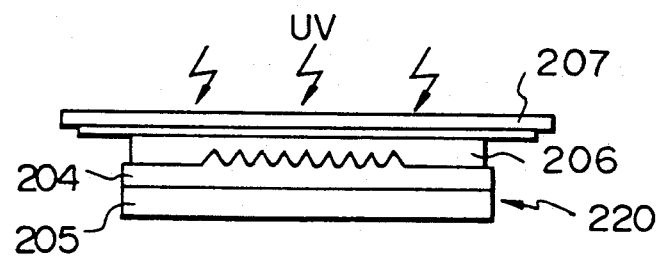
Figure 23G:
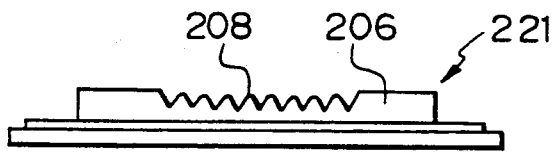

After that, a substrate 207 is disposed on the nickel layer 204 of the stamper 220 and an ultraviolet-setting resin 206 is filled between the substrate 207 and the nickel layer 204. Then ultraviolet rays are irradiated upon the ultraviolet-setting resin 206 through the substrate 207 which presses the resin 206 so that the resin 206 is hardened, as illustrated in FIG. 23f.

After that, the hardened resin 206 is removed from the stamper so that a hologram plate 221 having a reconstructed hologram 208 is obtained.

In accordance with the above-mentioned process, a surface relief type hologram is reconstructed which hologram comprises the substrate 207 and the ultraviolet-setting resin 206 formed on the substrate 207 and having a high density hologram 208 of high spatial frequency reconstructed thereon. Such a hologram surface 208 is easily deformed when contacted with a hand or a paper from outside.

Figure 21:
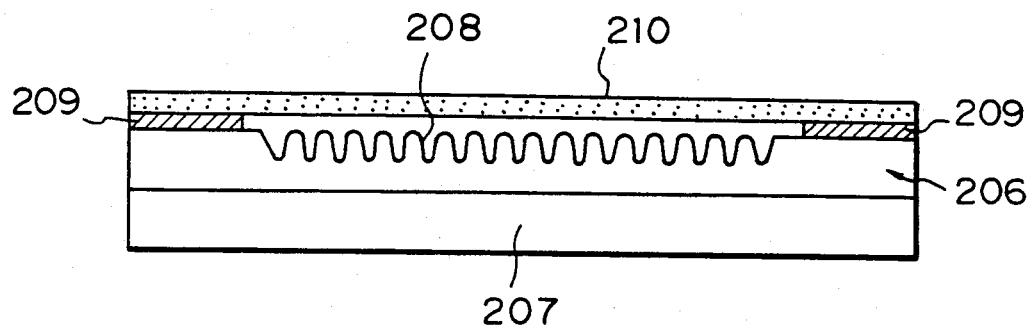
FIG. 21 is a vertical sectional side view of an example of the hologram in accordance with the prior art.

In order to protect the hologram surface 208, it is proposed, as illustrated in FIG. 21, to cover the hologram surface 208 with a protection plate 210 through a spacer 209.

Figure 22:
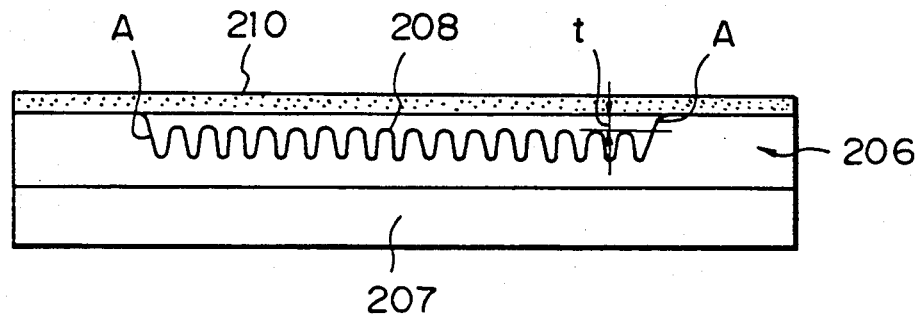
FIG. 22 is a vertical sectional side view of another example of the hologram in accordance with the prior art.

Another method of protecting the hologram surface 208 is to form the hologram resin 206 so that a predetermined gap (t) is formed on the hologram surface 208 when covered by a protection plate 210, as illustrated in FIG. 22.

However, with respect to the former method for protecting the hologram surface 208, it is troublesome to arrange the spacer 209 before covering the hologram surface 208 with the protection plate 210. Also, with respect to the latter method, it is hard to precisely adjust the height of the shoulder portion (A) of the ultraviolet-setting resin 206 around the hologram portion 208 to form the predetermined gap (t) which is less than 1 $\mu$m between the protection plate 210 and the hologram surface 208.

Still another method for protecting the hologram surface 208 is to arrange a protection film above the hologram surface 208 instead of the protection plate 210 mentioned above. However, when the film is disposed over the entire area of the hologram surface 208, the film deforms downward so that the central portion of the film comes in contact with the hologram surface 208 and deforms the hologram, when the hologram surface area is very large. Such a deformation of the hologram surface results in that the reconstruction of the image is impaired since the deflection ratio of the hologram becomes uneven on the hologram surface.

In accordance with the above-mentioned surface relief type deflective grating (hologram), the hologram 208 is protected by the noncontact cover plate 210 which is disposed over the hologram surface through the gap (t). However, such a protection method involves the problems as mentioned above. Such a protection method is also disclosed in Japanese Patent Application Laying Open (KOKAI) No. 58-180509 with respect to the surface relief type hologram. The publication discloses a noncontact protection structure constituted by a protection layer having a height equal to or larger than the thickness of the hologram and arranged without contacting with the hologram surface. However, this protection method also involves the problem that the arrangement of the protection structure is complicated and troublesome.

In accordance with the present invention, the above-mentioned problems are obviated by a process for producing a hologram deflective element comprising steps of: (a) forming a metallic stamper by an electroforming process by using a prototype plate of a surface relief type hologram; (b) filling the stamper with an ultraviolet-setting resin so as to reconstruct the hologram on a wide area of a surface of the ultraviolet-setting resin; and (c) forming a protection layer having a refractive index different from that of the ultraviolet-setting resin and disposed in contact with the hologram.

In accordance with the above-mentioned hologram of the present invention, the hologram is made from the ultraviolet-setting resin and the protection layer is arranged in contact with the hologram surface. Therefore, it becomes unnecessary to arrange the noncontact protection means as the prior art structure such as the arrangement of the spacer between the protection plate and the hologram surface and the arrangement of shoulder portion of the ultraviolet-setting resin around the hologram area reconstructed therein. This is because the ultraviolet-setting resin is hard and rigid when compaired with the photoresist used in the prior art structure, which makes it possible to arrange the protection means in surface-contact with the hologram surface without impairing the deflection efficiency of the hologram. Accordingly, it becomes possible to simplify the manufacturing process of the hologram and realize a high density surface relief type deflective grating having a large deflective area.

An embodiment of the present invention is described hereinafter with reference to FIGS. 19 and 20. Note that the explanation of the process for producing the surface relief type deflective grating is deleted since it is already described with reference to FIGS. 23a to 23g. The same or corresponding parts are designated by the same numerals.

An ultraviolet-setting resin layer 211 is formed on a substrate 207 of the surface relief type deflective grating. The ultraviolet-setting resin layer 211 has a high density hologram 212 of high spatial frequency reconstructed thereon. The ultraviolet-setting resin layer 211 having the reconstructed hologram 212 thereon is formed over a wide area on the substrate 207, for example, an area of 30 mm vertical and 30 mm horizontal. A protective glass plate 213 (or transparent acrylic plate) is disposed on the hologram 212 in a state of contacting with tips of the hologram 212. The protective glass plate 213 has an index of refraction which is different from that of the ultraviolet-setting resin layer 211. Dents (B) of the hologram 212 is filled with air.

As mentioned above, since the hologram 212 is made on the ultraviolet-setting resin layer 211 which is relatively strong and rigid and not easily deformed, it becomes possible to arrange the glass plate 213 in contact with the hologram 212. Therefore, it becomes unnecessary to interpose the spacer 209 as the structure of FIG. 21 or form the shoulder portion (A) on the ultraviolet-setting resin layer around the hologram portion as the structure of FIG. 22 so as to arrange a noncontact protection plate over the hologram. Accordingly, it becomes possible to easily manufacture a high density surface relief type deflective grating element having a large deflective area of high spatial frequency and high deflective efficiency.

It is to be noted that the minute deformation of the hologram does not impair the practical function thereof for the ornamental use thereof.

Another embodiment of the present invention is described below with reference to FIG. 20.

This embodiment comprises a transparent lacquer layer 214 for protecting the hologram 212. The index of refraction of the lacquer layer 214 is different from that of the ultraviolet-setting resin layer 211. The dents (B) of the hologram 212 is filled with the lacquer so that the protective lacquer layer 214 and the ultraviolet-setting resin hologram layer 211 come in complete contact with each other over the entire area thereof.

Figure 20:
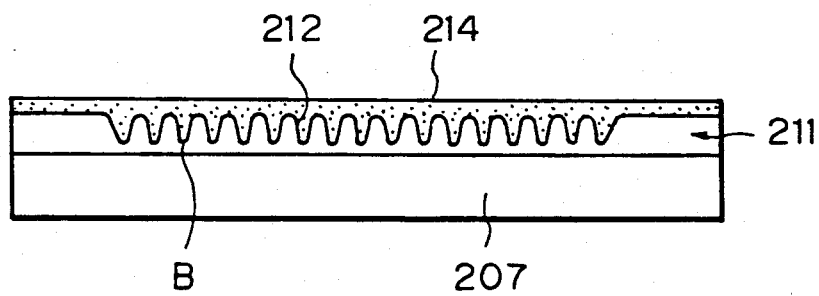
FIG. 20 is a vertical sectional side view of another example of the hologram in accordance with the present invention.

In accordance with the above-mentioned structure of FIG. 20, it becomes possible to realize a large sized surface relief type deflective grating since it is possible to form a high density hologram 212 having a high deflective efficiency over a wide area on the substrate 207.

Figure 19:
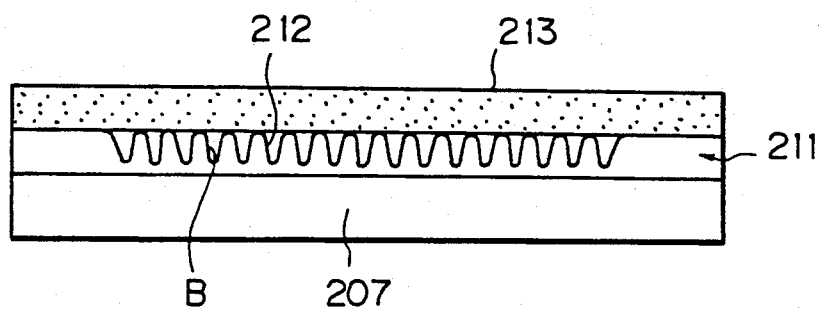
FIG. 19 is a vertical sectional side view of an example of the hologram in accordance with the present invention.

As mentioned above, in accordance with the above-mentioned embodiments of FIGS. 19 and 20 of the present invention, it becomes possible to arrange the protective layer having a index of refraction different from that of the ultraviolet-setting resin to come in contact with the hologram surface. Therefore, it becomes unnecessary to interpose the spacer of the prior art or form the shoulder portion on the ultraviolet-setting resin layer around the hologram portion as the structure of prior art so as to arrange a noncontact protection layer over the hologram. Accordingly, it becomes possible to easily manufacture a high density surface relief type deflective grating element having a large deflective area of high spatial frequency and high deflective efficiency.

Also, it is to be noted that the minute deformation of the hologram does not impair the practical function thereof for the ornamental use thereof.

A still further embodiment of the present invention is described hereinafter in comparison to the prior art.

Figure 30:
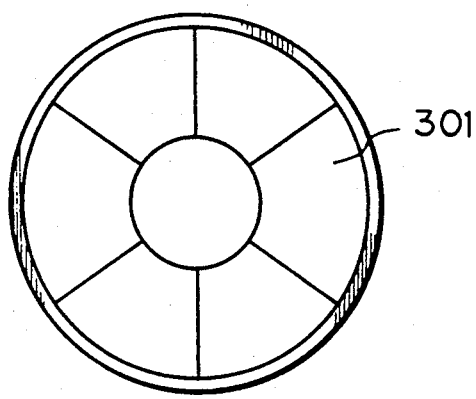
FIG. 30 is a plan view of a hologram disk of the prior art.
Figure 31:
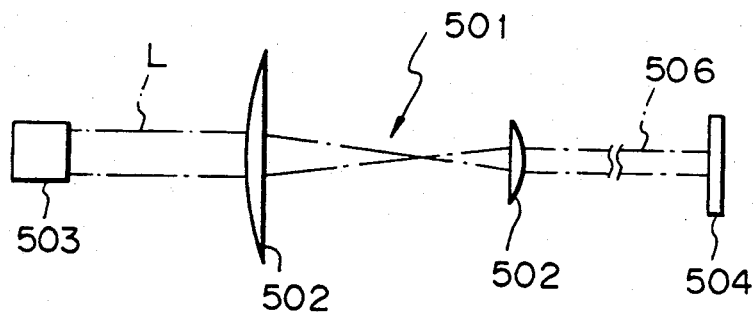
FIG. 31 an explanatory view of an embodiment of a hologram scanner in accordance with the present invention.

Conventionally, for example, a hologram disk 301 used for a bar code reader as illustrated in FIG. 30 is produced by a so-called 2P method using an ultraviolet-setting resin. The process for producing the hologram disk 301 by the 2P method is as follows.

First, a metallic stamper is produced from a prototype of a surface relief type deflective grating by an electroforming method or the like. An ultraviolet-setting resin is charged in the stamper and a substrate plate is pressed against the ultraviolet-setting resin from the upper surface thereof. In this state, ultraviolet rays are irradiated upon the ultraviolet-setting resin to harden the resin so that a surface relief type deflective grating, i.e., the hologram is reconstructed on the resin surface. After that, the substrate is separated from the stamper so that the reconctructed hologram disk 301 is obtained.

In the above-mentioned process for producing the grating element, the substrate is usually made from an acrylic resin which has a high moisture absorption property and easily deformed at a low temperature. Therefore, the substrate is deformed by heat or after a long time of use.

In order to obviate the above-mentioned problems of moisture absorption and thermal deformation, a polycarbonate resin may be used instead of the acrylic resin. However, the polycarbonate resin has a characteristic of double refraction. Therefore, the resin can not be used when the optical polarizing plane is influential.

Also, in accordance with the above-mentioned 2P method using the ultraviolet-setting resin, the substrate is deformed to concave in the resin side since the resin shrinks at the time of being hardened by irradiating ultraviolet rays thereupon.

A method for avoiding the deformation of the substrate mentioned above is arrange two substrates on both sides of the resin layer or dispose a cover over the substrate. However, such a method is costly and makes the structure complicated, which impairs the productivity of the hologram.

The above-mentioned problems are obviated by an embodiment of a producing method of a grating element of the present invention which comprises steps of: (a) forming a stamper by an electroforming process from a prototype of a surface relief type deflective grating; (b) injecting the stamper with an ultraviolet-setting resin; (c) irradiating ultraviolet rays upon the ultraviolet-setting resin to harden the resin in a state of being pressed by a substrate plate which has a thickness more than 20 times as large as that of the ultraviolet-setting resin after being hardened; and (d) separating the substrate plate from the stamper.

The above-mentioned problems are obviated by another embodiment of a producing method of a grating element of the present invention which comprises steps of: (a) forming a stamper by an electroforming process from a prototype of a surface relief type deflective grating; (b) injecting the stamper with an ultraviolet-setting resin; (c) irradiating ultraviolet rays upon the ultraviolet-setting resin to harden the resin in a state of being pressed by a substrate plate which is made from one of polystyrene and polycyclohexylmethacrylate; and (d) separating the substrate plate from the stamper.

The above-mentioned problems are also obviated by still another embodiment of a producing method of a grating element of the present invention which comprises steps of: (a) forming a stamper which is more than 0.3 mm thick by an electroforming process from a prototype of a surface relief type deflective grating; (b) injecting the stamper with an ultraviolet-setting resin; (c) irradiating ultraviolet rays upon the ultraviolet-setting resin to harden the resin in a state of being pressed by a substrate plate; and (d) separating the substrate plate from the stamper.

The above-mentioned problems are also obviated by still another embodiment of a producing method of a grating element of the present invention which comprises steps of: (a) forming a stamper by an electroforming process from a prototype of a surface relief type deflective grating; (b) injecting the stamper with an ultraviolet-setting resin; (c) irradiating ultraviolet rays upon the ultraviolet-setting resin to harden the resin in a state of being pressed by a substrate plate so that the thickness of the ultraviolet-setting resin after being hardened becomes less than 25 $\mu$m; and (d) separating the substrate plate from the stamper.

The above-mentioned problems are also obviated by still another embodiment of a producing method of a grating element of the present invention which comprises steps of: (a) forming a stamper by an electroforming process from a prototype of a surface relief type deflective grating; (b) injecting the stamper with an ultraviolet-setting resin; (c) irradiating ultraviolet rays upon the ultraviolet-setting resin to harden the resin in a state of being pressed by a substrate plate; and (d) separating the substrate plate from the stamper under a condition that the substrate is compulsively forced to deform toward a direction opposite to that of a deformation of the substrate due to stress generated therein in the above step (c);

The above-mentioned problems are also obviated by still another embodiment of a producing method of a grating element of the present invention comprises steps of: (a) forming a stamper by an electroforming process from a prototype of a surface relief type deflective grating; (b) injecting the stamper with an ultraviolet-setting resin; (c) irradiating ultraviolet rays upon the ultraviolet-setting resin to harden the resin in a state of being pressed by a substrate plate; (d) separating the substrate plate from the stamper; and (e) forming slits in the ultraviolet-setting resin on which the surface relief type deflective grating is reconstructed.

In accordance with the first and second embodiments of the producing method of a grating element of the present invention mentioned above, the grating element is produced in such a manner that the thickness of the substrate is arranged more than 20 times as large as that of the ultraviolet-setting resin after being hardened by irradiating ultraviolet rays thereupon and that the substrate is made from polystyrene or polycyclohexylmethacrylate. Therefore, the characteristic of the substrate is upgraded from the stand point of moisture absorption and double refractivity thereof, which makes it possible to attenuate the deformation of the substrate due to shrinkage of the ultraviolet-setting resin.

In accordance with the third embodiment of the producing method of a grating element of the present invention mentioned above, the grating element is produced in such a way that the thickness of the stamper becomes more than 0.3 mm in the stamper forming process, which strengthens the stamper in comparison to the prior art structure.

In accordance with the fourth embodiment of the producing method of a grating element of the present invention mentioned above, the grating element is produced in such a way that a substrate is disposed on the ultraviolet-setting resin charged in the stamper to press the resin from the upper side thereof and that ultraviolet rays are irradiated upon the ultraviolet-setting resin in the state of being pressed by the substrate as mentioned above so that the thickness of the ultraviolet-setting resin becomes less than 25 $\mu$m after being hardened by the ultraviolet rays. Therefore, it becomes possible to even the thickness of the ultraviolet-setting resin over the entire area thereof.

In accordance with the fifth embodiment of the producing method of a grating element of the present invention mentioned above, the grating element is produced in such a way that the substrate is separated from the stamper under the condition that the substrate is compulsively forced to deform to the direction opposite to that of the deformation due to stress applied to the substrate in the process of hardening the ultraviolet-setting resin by irradiating ultraviolet rays thereupon. Therefore, the substrate becomes flat by the plastic deformation thereof after separated from the stamper.

In accordance with the sixth embodiment of the producing method of a grating element of the present invention mentioned above, the grating element is produced in such a way that slits are formed in the ultraviolet-setting resin on the substrate on which resin the surface relief type deflective grating is reconstructed. Therefore, tension stress of the grating element is weakened.

The above-mentioned first to sixth embodiments of the producing method of a grating element of the present invention are further described hereinafter with reference to FIGS. 24 to 29a, 29b and 29c.

Figure 24:
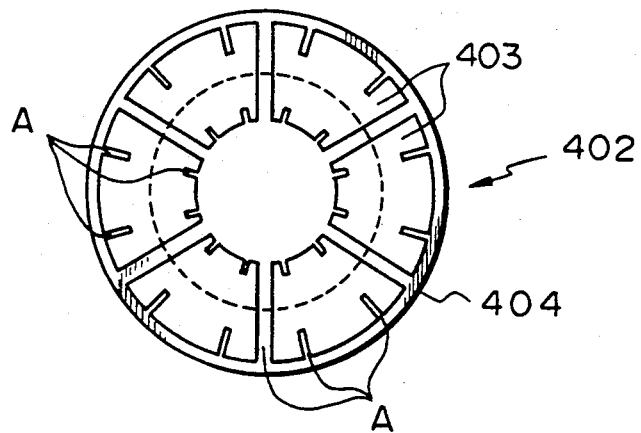
FIG. 24 is a plan view of an embodiment of the stamper in accordance with the present invention.

The example of the grating element of the present invention described below is a hologram disk 402 (FIG. 24) used for a bar code reader and produced in accordance with the afore-mentioned 2P method. The hologram disk 402 comprises a substrate 404 and an ultraviolet-setting resin layer 403 formed on the substrate 404. In FIG. 24, circle in dash line represents a trace of the incident beam.

In general, an ultraviolet-setting resin shrinks at the time of being set by ultraviolet rays. Therefore, the substrate 404 of the ultraviolet-setting resin 403 deforms due to the shrinkage of the resin 403 formed thereon. In order to minimize the deformation of the substrate so that it does not affect the optical characteristic of the deflective grating in practical use, the hologram disk (grating element) of the present invention is produced in accordance with the following process.

In accordance with the first embodiment of the invention mentioned above, the thickness of the substrate 404 is more than 20 times as large as that of the ultraviolet-setting resin 403. The reason for this arrangement is as follows.

The surface relief type deflective grating has a number of dent portions of interference fringe groove. When the groove is deepened, the substrate 404 becomes easy to deform as a volume type deflective grating (volume hologram). Due to this deformation of the substrate 404, problems arise such that the direction of deflection changes and that the deflected beam is shifted.

Here, consideration is made on an example of a hologram disk for a bar code reader, assuming that the focal length thereof is 250 mm, the thickness of the substrate 404 is 1 mm and the thickness of the ultraviolet-setting resin layer 403 is 30 to 50 μm. In this case, if the deformation of the substrate 404 due to the shrinkage of the ultraviolet-setting resin layer 403 is less than 1000 mm regarding the radius of curvature, dislocation of the beam deflected by the hologram is less than 1 mm even including change of the deflection angle and displacement of the deflected beam. However, under an assumption that the thickness of the ultraviolet-setting resin layer 403 is about 100 μm, the dislocation of the beam deflected by the hologram exceeds 1 mm, even if the deformation of the substrate 404 is less than 1000 mm regarding the radius of curvature. Such a dislocation of the deflected beam more than 1 mm is not allowable for the scanning accuracy of the bar code reader.

Therefore, in order to reduce the dislocation of the deflected beam to less than the allowable limit for the scanning accuracy, it is necessary to sufficiently thicken the substrate 404 with respect to the thickness of the ultraviolet-setting resin layer 403. Therefore, in accordance with the present invention, the thickness of the substrate 404 is arranged more than 20 times as large as that of the ultraviolet-setting resin layer 403, which makes it possible to minimize the dislocation of the deflected beam so that the dislocation becomes negligible. More specifically, when the thicknenn of the ultraviolet-setting resin layer 403 is assumed to be 25 μm, it is necessary that the thickness of the substrate 404 is at least $25 \times 20 = 500$ μm.

In accordance with the second embodiment of the above-mentioned method of the present invention, the material of the substrate is selected from the stand point of moisture absorption and double refraction thereof. The reason for this is as follows.

For example, polystyrene and polycyclohexylmethacrylate have a low moisture absorption charcteristic and almost no double refraction property. By using such materials as the substrate 404, it becomes possible to minimize the deformation of the substrate due to a long time of use, which makes it possible to apply the hologram to an optical device in which the polarization plane is important. Therefore, in accordance with the second embodiment of the present invention, the substrate 404 is made from the above-mentioned polystyrene or polycyclohexylmethacrylate instead of acryl or polycarbonate of prior art.

In accordance with the third embodiment of the above-mentioned method of the present invention, the hologram is produced in such a way that in the step of forming the metallic stamper, the thickness thereof is arranged to become 0.3 mm. The reason for this is as follows.

The stamper 405 is made from a metallic material such as nickel (Ni). If the nickel stamper is very thin, it deforms at the time of removing the set ultraviolet-setting resin 403 therefrom. By arranging the stamper to be 0.3 mm thick or more, it becomes possible to minimize the deformation thereof at the time of separating the substrate from the stamper, thus minimizing change of the focal length of the hologram. Accordingly, the stamper can be repeatedly used many times, which saves the running cost of the scanner using the hologram.

In accordance with the fourth embodiment of the above-mentioned method of the present invention, the hologram is produced by such a way that the stamper 405 is injected with an ultraviolet-setting resin 403 and that ultraviolet rays are irradiated upon the resin in a state wherein the substrrate 404 presses the resin from the upper side thereof, in which the ultraviolet-setting resin becomes less than 25 μm after being set by the ultraviolet rays. The reason for such an arrangement is as follows.

Figure 25:
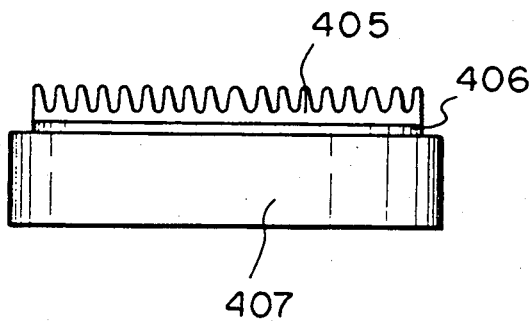
FIG. 25 is a side view of a stamper to which the present invention is applied.
Figure 26:
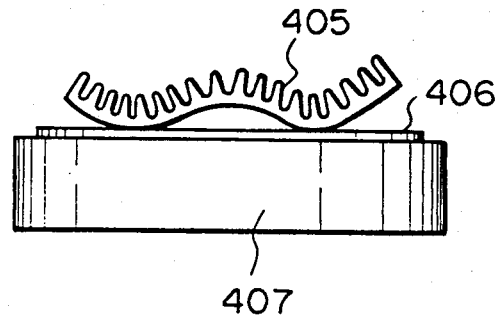
FIG. 26 is an explanatory view of the stamper for explaining a state wherein the stamper is deformed after many times of use.
Figure 27:
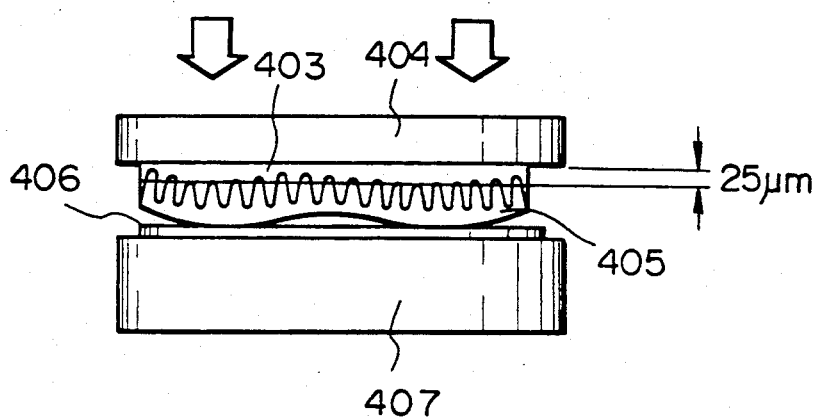
FIG. 27 is an explanatory view for explaining a state wherein an ultraviolet curing resin is arranged between the stamper and a substrate and cured by ultraviolet rays.
Figure 28:
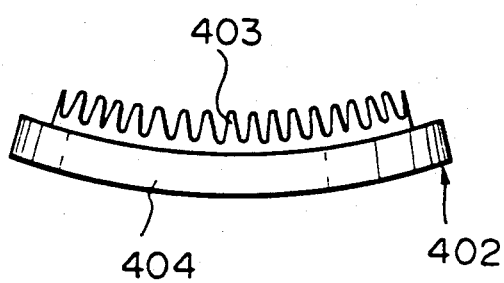
FIG. 28 is an explanatory view for explaining a state wherein the hologram is separated from the stamper of FIG. 27.

The stamper 405 used for reconstructing the hologram is generally secured to a flat surface of a support plate 407 through an epoxy resin 406, as illustrated in FIG. 25. A large tension stress is applied to the stamper 405 at the time of separating the ultraviolet-setting resin layer therefrom after the hologram is reconstructed on the resin. Therefore, the stamper 405 deforms to an undulation shape as illustrated in FIG. 26 after several times of use. This causes an uneven thickness of the ultraviolet-setting resin layer, which changes the focal length of the hologram since the ultraviolet-setting resin of uneven thick functions as a lens.

In order to cope with this problem, the stamping process is conducted in such a way that the ultraviolet-setting resin 403 is disposed between the substrate 404 and the stamper 405 on the epoxy resin 406 under a condition that the gap formed between the stamper 405 and the epoxy resin 406 is smaller than the deformation of the substrate 404 which presses the ultraviolet-setting resin 403.

More specifically, if the thickness of the ultraviolet-setting resin 403 becomes less than 25 μm after being set by ultraviolet rays, the radius of curvature of the undulation of the stamper becomes approximately 2000 mm. The focal length (f) of the lens formed by the undulation is represente as;

$$1/f \approx (n-1)(1/r_1 - 1/r_2) \quad (1)$$

wherein character n represents the index of refraction of the ultraviolet-setting resin 403 and n=1.5 mm and character $r_1$ represents the radius of curvature of the undulation. Also, $r_2 \approx \infty$.

From the equation (1), it is derived that the focal length (f) of the undulation is approximately 4000 mm (f≈4000). This means that under an assumption that the focal length of the hologram disk 402 of the scanner is initially 250, the focal point is shifted merely by ±15 mm by the lens function of the above-mentioned undulation. Such a small dislocation of the focal length of the hologram does not impair the reading ability of the scanner which uses an He-Ne laser since the depth of field for reading the bar code of the scanner is more than 80 mm.

Therefore, by arranging the ultraviolet-setting resin in such a manner that the thickness thereof becomes less than 25 μm, it becomes possible to minimize the lens effect of the undulation of the stamper which undulation is generated after the stamper is repeatedly used many times. Also, it becomes possible to minimize the unevenness of the thickness of the ultraviolet-setting resin 403 so that the lens effect due to the deformation of the resin 403 becomes negligible, which minimizes the dislocation of the deflected beam, fluctuation of the focal length of the hologram and deformation of the convergent beam section.

In accordance with the fifth embodiment of the above-mentioned method of the present invention, the hologram is produced in such a way that the substrate is forced to deform toward a direction opposite to the deformation of the substrate on which the hologram of the present invention is reconstructed. The reason for this arrangement is as follows.

Figure 29A:
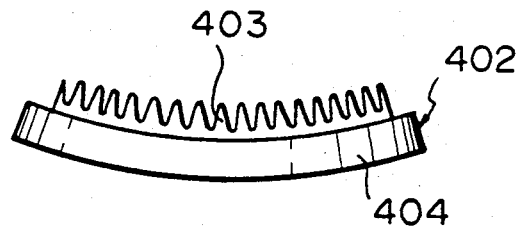
FIGS. 29a to 29c are explanatory views for explaining an example of a process for recovering the curved hologram disk, each representing a different step thereof in sequence, respectively.
Figure 29B:
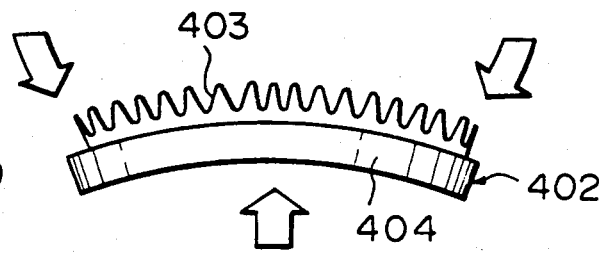
Figure 29C:
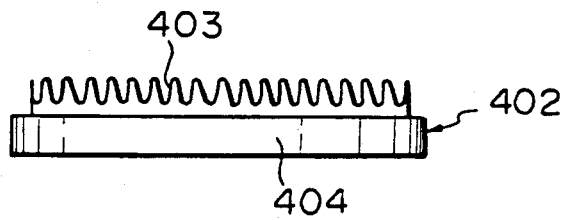

As illustrated in FIG. 29a, the substrate 404 is deformed to concave in the side of the ultraviolet-setting resin 403 right after being separated from the stamper. The substrate 404 is compulsively forced to deform in the direction opposite to the direction of the deformation of FIG. 29a, as illustrated in FIG. 29b. By this compulsive force applied to the substrate 404, the deformation of the substrate 404 is corrected due to the plastic deformation thereof toward the oppsite direction to that of the deformation already generated in the substrate. Thereby, a flat hologram disk 402 is obtained, as illustrated in FIG. 29c, wherein the deformation thereof is corrected.

In accordance with the sixth embodiment of the above-mentioned method of the present invention, a plurality of slits (A) are formed in the hologram of the ultraviolet-setting resin 403, as illustrated in FIG. 24. The reason for this arrangement of slits is as follows.

Due to the slits formed in the ultraviolet-setting resin 403, it becomes possible to absorb the tension stress applied thereto so that the deformation of the ultraviolet-setting resin 403 due to shrinkage thereof does not significantly affect to the characteristic of the hologram disk 402.

It is to be noted that the slits may be formed by providing corresponding projections on the stamper side.

The above-mentioned first to sixth embodiments of the present invention constitutes one flow of producing the hologram disk in sequence, basically in accordance with the 2P method. The above-mentioned producing flow is summarized as follows.

First, the stamper 405 having a thickness more than 0.3 mm is produced. The ultraviolet-setting resin 403 is injected into the stamper 405. The material of the substrate 404 is selected from the stand point of moisture absorption and double refraction. The ultraviolet-setting resin 403 is set by irradiating ultraviolet rays thereupon in a state of being pressed by the substrate 404 so that the set resin 403 becomes less than 25 µm thick. The thickness of the substrate 404 is more than 20 times as large as that of the than 20 times as large as that of the ultraviolet-setting resin 403. A plurality of slits are formed in the ultraviolet-setting resin 403. After that, the deformation of the hologram disk 402 is corrected by applying a force thereto to generate a plastic deformation therein to deform it in the direction opposite to that of the deformation already generated therein.

In accordance with the above-mentioned process for reconstructing the surface relief type deflective grating on the substrate 404 of the present invention, it becomes possible to minimize the adverse influence from the deformation of the substrate 404 due to the shrinkage of the ultraviolet-setting resin 403 or a long time of use, which makes it possible to avoid the degradation of the optical characteristic of the scanner caused by the dislocation of the deflected scanning beam. Also, it becomes possible to reduce the running cost of the scanner since the service life of the stamper is elongated by increasing the thickness thereof so that the stamper is strengthened and can be repeatedly used many times.

In accordance with the first embodiment of the hologram producing method of the present invention, since the thickness of the substrate is arranged to become 20 times as large as that of the ultraviolet-setting resin, it becomes possible to neglect the dislocation of the deflected scanning beam, which makes it possible to save time and labour for adjusting the optical system considering the dislocation of the beam.

In accordance with the second embodiment of the hologram producing method of the present invention, since the substrate is made from polystyrene or polycyclohexylmethacrylate which is superior from the stand point of moisture absorption and double refraction, it becomes possible to minimize the deformation of the substrate after a long time of use.

In accordance with the third embodiment of the hologram producing method of the present invention, since the thickness of the stamper is arranged to become more than 0.3 mm, the stamper is strengthened and can be used repeatedly many times so that the running cost of the scanner can be saved.

In accordance with the fourth embodiment of the hologram producing method of the present invention, since the thickness of the ultraviolet-setting resin is arranged to become less than 25 µm in the state of being interposed between the stamper and the substrate and irradiated by ultraviolet rays, it becomes possible to minimize the dislocation of the deflected beam, fluctuation of the focal length of the hologram and deformation of the convergent beam section.

In accordance with the fifth embodiment of the hologram producing method of the present invention, since a force is compulsively applied to the substrate in the direction opposite to that of the deformation of the substrate separated from the stamper and having the ultraviolet-setting resin layer of hologram reconstructed thereon, it becomes possible to obtain a flat substrate by removing the deformation by compulsively applying the opposite plastic deformation to the substrate, thus miminizing the dislocation of the deflected scanning beam.

In accordance with the sixth embodiment of the hologram producing method of the present invention, since a plurality of slits are formed in the ultraviolet-setting resin which is the material of the hologram as the surface relief type deflective grating, the tension stress generated in the ultraviolet-setting resin layer is absorbed so that it becomes possible to minimize the deformation of the hologram disk due to the shrinkage of the ultraviolet-setting resin after a long time of use, which minimizes the dislocation of the deflected scanning beam so that the scanning reliability is increased.

A still further embodiment of the present invention is described hereinafter with reference to FIGS. 31 to 34. In this embodiment, the hologram disk is applied to a laser bar code scanner.

A beam compressor 501 which is composed of a pair of cylindrical lenses 502 is arranged on an optical path between a laser source 503 and a hologram disk 504 as a means for adjusting a sectional shape of the laser beam. The beam compressor 501 deforms the sectional shape of the incident beam thereto to a shape that is long in a direction (M) of horizontal scanning (main scanning direction) and short in a direction (S) of vertical scanning (sub-scanning direction).

The function of the beam compressor 501 is more specifically described hereinafter under a condition that the laser source 503 emits a laser beam having a wavelength of 780 nm and the hologram disk 504 comprises a hologram of linear grating.

Figure 32:
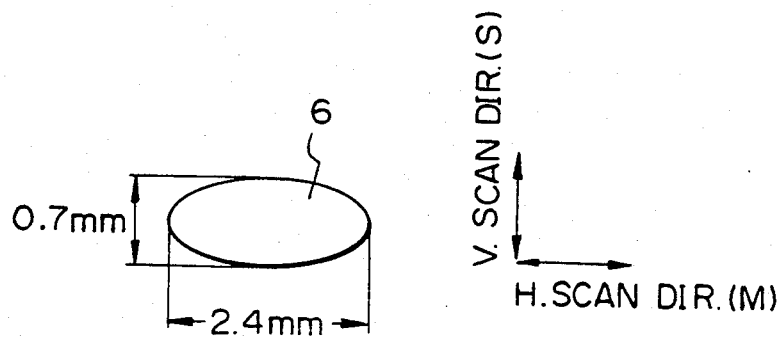
FIG. 32 is an explanatory view of a deformed laser beam incident upon the hologram disk in accordance with the present invention.

The laser source 503 emits a laser beam L which passes through the beam compressor 501 comprising the pair of cylindrical lenses 502. The laser beam L is deformed by the beam compressor 502 so that the beam spot shape becomes horizontally long and vertically short, that is long in the horizontal main-scanning direction (M) and short in the vertical sub-scanning direction (S), as illustrated in FIG. 32. After that, the laser beam L is irradiated upon the surface of the hologram disk 504 having linear gratings. The hologram disk 504 is arranged in such a way that the beam waist of the horizontal scanning beam is approximately 270 mm from the position thereof and that the hologram has an astigmatic difference of 50 to 60 mm.

Figure 33:
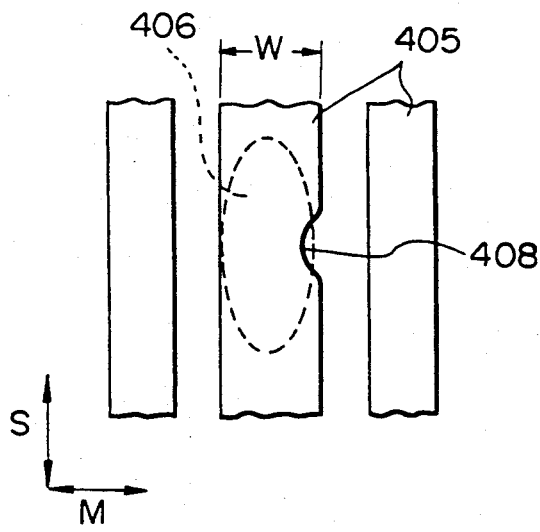
FIG. 33 is an explanatory view of a state wherein the deformed oval laser beam is irradiated to the bar code surface.

FIG. 37 graphically represents an optical convergent characteristic of the hologram disk 504 with respect to an incident beam 506 which is deformed to have a horizontally long sectional shape as mentioned above. The ordinate of the graph represents the diameter of beam and the abscissa of the graph represents distance of the beam from the hologram. As can be seen from the graph, the beam diameter in the vertical scanning direction (S) does not so much change with respect to the distance from the hologram disk 504. Whereas, the beam diameter in the horizontal scanning direction (M) changes forming a curved line as represented in the graph. The diameter of the horizontal scanning beam spot 506 which is long in the horizontal direction (M) is shortened in the horizontal direction by being deflected by the hologram disk 504 after passing therethrough in accordance with the convergent characteristic of the hologram represented in the graph of FIG. 37. Therefore, it becomes possible to converge the deflected deformed beam 506 by the function of the hologram disk 504 to have a beam diameter equal to the width of the bar code 505, as illustrated in FIG. 33, by adjusting the position of the bar code 505.

Such a convergent function of the hologram disk is more specifically described with reference to an experimental result below.

The experiment was conducted by using a deformed beam 506 having a sectional shape, as illustrated in FIG. 32, of 2.4 mm in the horizontal scanning direction (M) and 0.7 mm in the vertical scanning direction (S). The deformed beam 506 is made by the beam compressor 501 and irradiated upon the hologram disk 504 at an angle of incidence of 40°. The beam 506 is deflected by the hologram disk 504 by an angle of deflection of 30°. The diameter of the deflected beam 506 at a position rotated from a position on a symmetrical surface of the scanning line of 10° of the hologram disk 504 was reduced to about half in comparison to the case of using a beam having a circular sectional shape of 2.4 mm diameter.

As mentioned above, the laser beam L is predeformed to have a sectional shape that is long in the horizontal scanning direction (M) while short in the vertical scanning direction (S) by the beam compressor 501 before passing through the hologram disk 504. The laser beam L which is deformed in the above-mentioned manner passes through the hologram disk 504 which deflects the laser beam L. The deflected laser beam L is deformed so that the beam diameter is short in the horizontal scanning direction (M) and long in the vertical scanning direction (S) on the scanning surface in accordance with the convergent characteristic of the hologram as represented by the graph of FIG. 37. Thereby, the horizontal beam diameter can be arranged less than the width of the bar code 505, as illustrated in FIG. 33, so that the bar code 505 can be reliably read by the deformed scanning beam 506.

Figure 34:
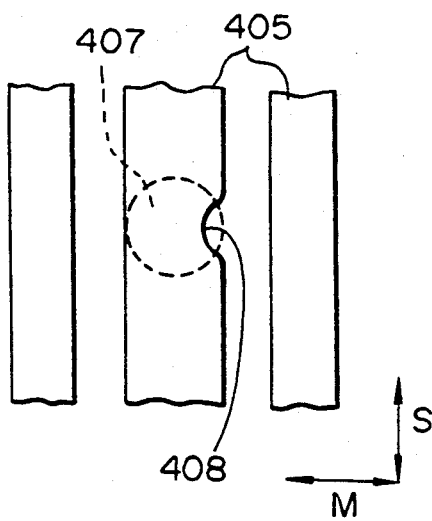
FIG. 34 is an explanatory view of a state wherein a circular laser beam of the prior art is irradiated to the bar code surface.

That is, in comparison to the case of using a scanning beam 507 having a circular sectional shape, as illustrated in FIG. 34, by using the above-mentioned deformed scanning beam 506, it becomes possible to reduce the ratio of irradiation area for the defective portion 508 in relation to the entire spot area of the scanning beam. Therefore, the ratio of the scanning spot area covering the bar code 505 is increased so that it becomes possible to increase the optical amount of reflection beam from the scanning spot for the bar code detected by an optical sensor, which increases the reliability of reading the bar code.

Also, simply by deforming the laser beam L with the use of the beam compressor 501 so as to arrange the sectional beam shape horizontally long before passing through the hologram disk 504, it becomes possible to obviate the problem of astigmatism and increase the scanning angle of the hologram disk 504. Besides, it becomes possible to produce the hologram by an aligner with a simplified structure using a divergent spherical wave and a plane wave, which makes it possible to simplify the process for producing the same.

A still further embodiment of the present invention is described hereinafter with reference to FIGS. 35 and 36. Note that the corresponding parts of the above-mentioned embodiment are designated by the same reference numerals and explanation thereof are deleted. In this embodiment, the means for deforming the laser beam sectional shape is constituted by an aperture stop.

The laser source 503 emits a laser beam L having a circular sectional spot shape designated by numeral 509 in FIG. 35. The circular section laser beam 509 passes through the rotary hologram disk 504 which deflects the laser beam 509. The laser beam deflected by the hologram disk 504 has a vertically long sectional shape, as illustrated in FIG. 36a, at a predetermined distance away from the hologram disk 504. This beam section shape is in accord with the horizontally converged beam section shape obtained after passing through the hologram disk due to the convergent characteristic of the hologram represented by the graph of FIG. 37, mentioned above. The beam section shape changes according as the hologram disk 504 rotates. The degree of deformation of the beam section shape increases according as the rotation angle of the hologram disk 504 increases, as illustrated in FIGS. 36a to 36d, in sequence. In this case, due to the astigmatism of the hologram, the circular section beam 509 is changed to an ellipse section beam 510 by being deflected by the hologram disk 504.

An aperture stop means (not shown) is disposed on the optical path of the circular section beam 509 so as to form a horizontally long section beam 511, as illustrated in FIG. 35, by stopping the upper hatched portion and the lower hatched portion of the circular section of the beam 509, opening the central portion in a shape of a horizontal slot. The function and effect of this horizontally long section beam 511 are substantially the same as those of the above-mentioned deformed beam of FIG. 32. The horizontally long section beam 511 deforms according as the hologram disk 504 rotates, as illustrated in FIGS. 36a to 36d in sequence. As can be seen from the drawings, the lateral length (a) of the deformed beam 511 is shorter than the lateral length (b) of the ellipse section beam 510. Therefore, by forming a horizontally long deformed beam 511 by the aperture stop and deflecting the deformed beam 511 by the hologram disk 504, it becomes possible to converge the deformed beam 511 in the horizontal scanning direction (main scanning direction M) so that the horizontal diameter of the scanning beam on the bar code surface becomes substantially equal to the width of the bar code. Therefore, the same advantages as those obtained in the case of the above-mentioned embodiment of FIG. 32 can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An information reading device comprising:
   a semiconductor laser source for emitting a semiconductor laser beam;
   a first condenser lens for converging said emitted laser beam to form an irradiation beam;
   a beam shaping means for shaping said formed irradiation beam;
   a hologram disk for deflecting said shaped irradiation beam;
   an optical path separation means arranged so as to separate said shaped irradiation beam and a reflection beam from each other, said reflection beam being reflected from a surface irradiated by said deflected irradiation beam and being then deflected toward said optical path separation means by said hologram disk, said optical path separation means including a reflection portion disposed at a central portion of said optical path separation means for reflecting said shaped irradiation beam toward said hologram disk, and having the substantially same area as a cross-sectional area of said shaped irradiation beam, said cross-sectional area being defined by said optical path separation means when said shaped irradiation beam is made incident on said optical path separation means, said optical path separation means further including a transmission portion connected continuously to an outer circumference of said reflection portion so as to permit said reflection beam deflected toward said optical path separation means to be transmitted;
   a second condenser lens arranged on an optical path of said transmitted reflection beam for converging said transmitted reflection beam; and
   an optical sensor means for detecting said converged reflection beam.

2. An information reading device according to claim 1, which further comprises:
   a first reflection means disposed between said optical path separation means and said hologram disk for reflecting said reflected irradiation beam from said reflection portion toward said hologram disk; and
   a second reflection means disposed between said hologram disk and said surface for reflecting said deflected irradiation beam from said hologram disk toward said surface.

3. An information reading device according to claim 2, which further comprises a visible light source for emitting a visible beam in addition to said formed irradiation beam.

4. An information reading device according to claim 1, which further comprises a visible light source for emitting a visible beam in addition to said formed irradiation beam.

5. A hologram laser beam bar code scanner comprising:
   a laser source for emitting a laser beam;
   a beam deforming means for deforming said emitted laser beam in such a manner that a first length of said deformed laser beam in a vertical scanning direction becomes shorter than a second length of said emitted laser beam in said vertical scanning direction, to thereby form said deformed laser beam having a cross-sectional shape which is long in a horizontal scanning direction and is short in said vertical scanning direction;
   a hologram disk means disposed between said beam deforming means and a bar code surface for deflecting said deformed laser beam to thereby produce a deflection laser beam forming on said bar code surface such a cross-sectional shape that a third length in said vertical scanning direction is approximately equal to said first length of said deformed laser beam in said vertical scanning direction and a fourth length in said horizontal scanning direction is shorter than said third length in said vertical scanning direction, and for scanning said bar code surface in said horizontal scanning direction and said vertical scanning direction with said produced deflection laser beam; and
   an optical sensor for detecting a reflection laser beam which is reflected from said bar code surface and is thereafter deflected by said hologram disk means and for reading out a bar code information.

6. A hologram laser beam bar code scanner according to claim 5, in which said beam deforming means comprises a pair of cylindrical lenses spaced apart from each other.

7. A hologram laser beam bar code scanner according to claim 5, in which said beam deforming means comprises a beam deforming member provided with an aperture formed in a shape which is long in said horizontal scanning direction and is short in said vertical scanning direction.

* * * * *